April 18, 1944. S. T. HUNT 2,347,054
ELEVATOR CONTROL SYSTEM
Filed May 13, 1942 16 Sheets-Sheet 1

WITNESSES:

INVENTOR
Stanley T. Hunt.
BY
ATTORNEY

April 18, 1944.   S. T. HUNT   2,347,054

ELEVATOR CONTROL SYSTEM

Filed May 13, 1942   16 Sheets-Sheet 3

INVENTOR
Stanley T. Hunt.

April 18, 1944.   S. T. HUNT   2,347,054
ELEVATOR CONTROL SYSTEM
Filed May 13, 1942   16 Sheets-Sheet 5

INVENTOR
Stanley T. Hunt.

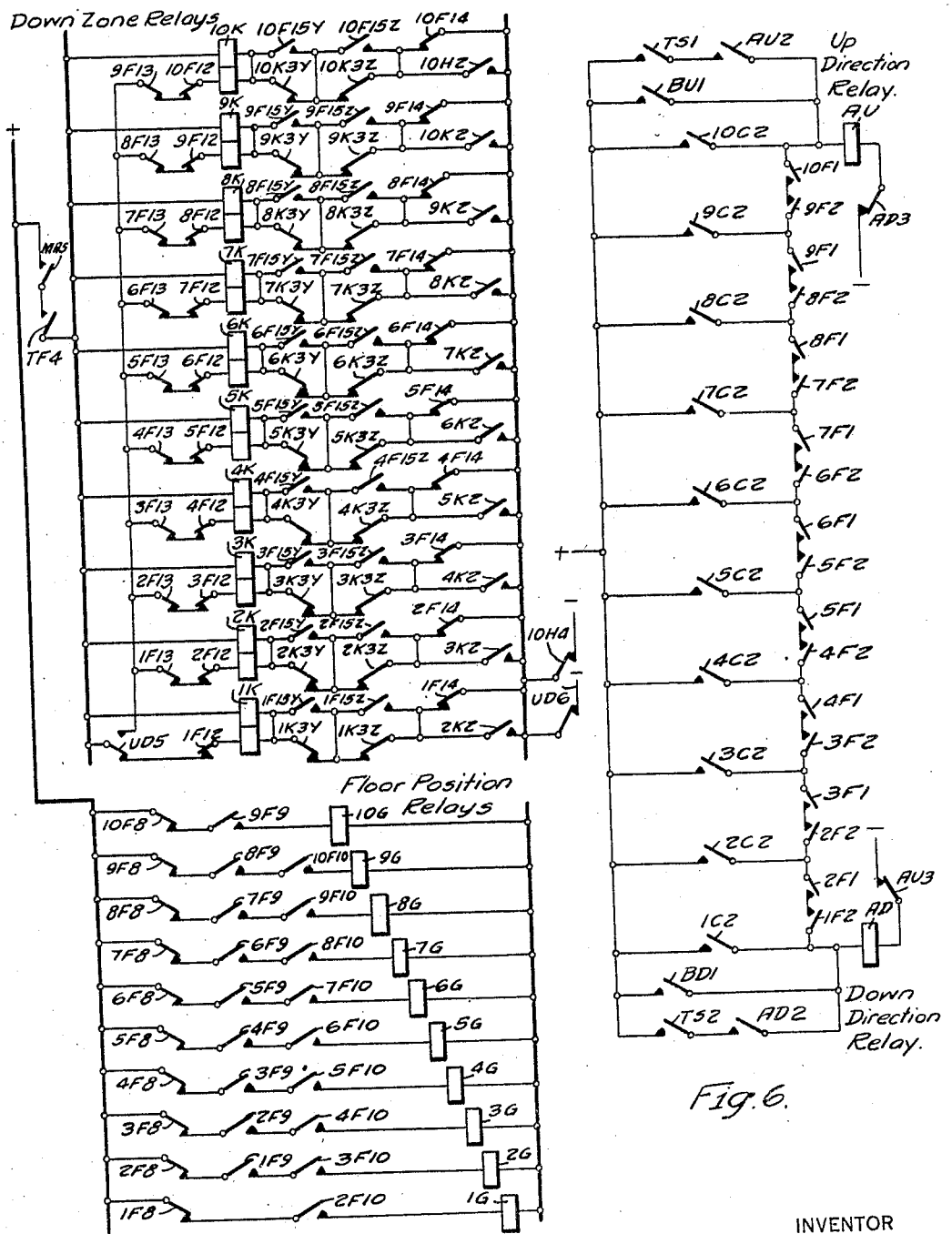

April 18, 1944.   S. T. HUNT   2,347,054
ELEVATOR CONTROL SYSTEM
Filed May 13, 1942   16 Sheets-Sheet 9

WITNESSES:
E. A. McCloskey
B. Irney Hines

INVENTOR
Stanley T. Hunt.
BY
ATTORNEY

Figure 7:
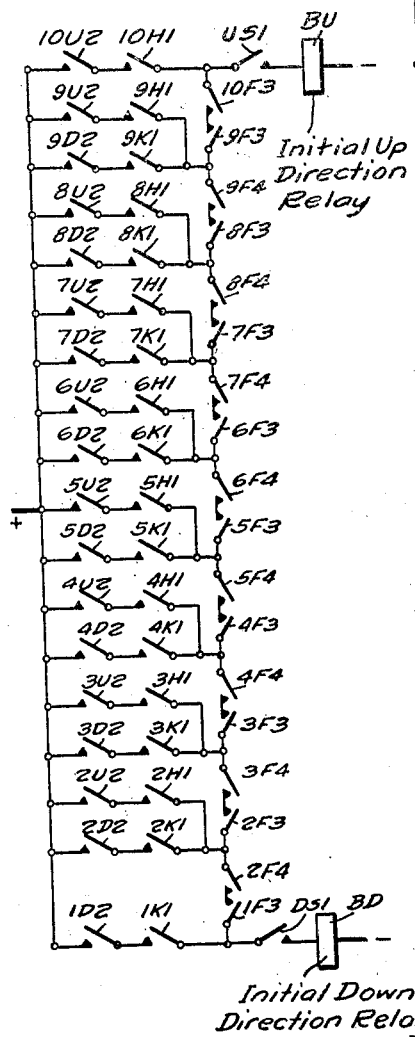

April 18, 1944.                S. T. HUNT                2,347,054
                        ELEVATOR CONTROL SYSTEM
                    Filed May 13, 1942      16 Sheets-Sheet 10
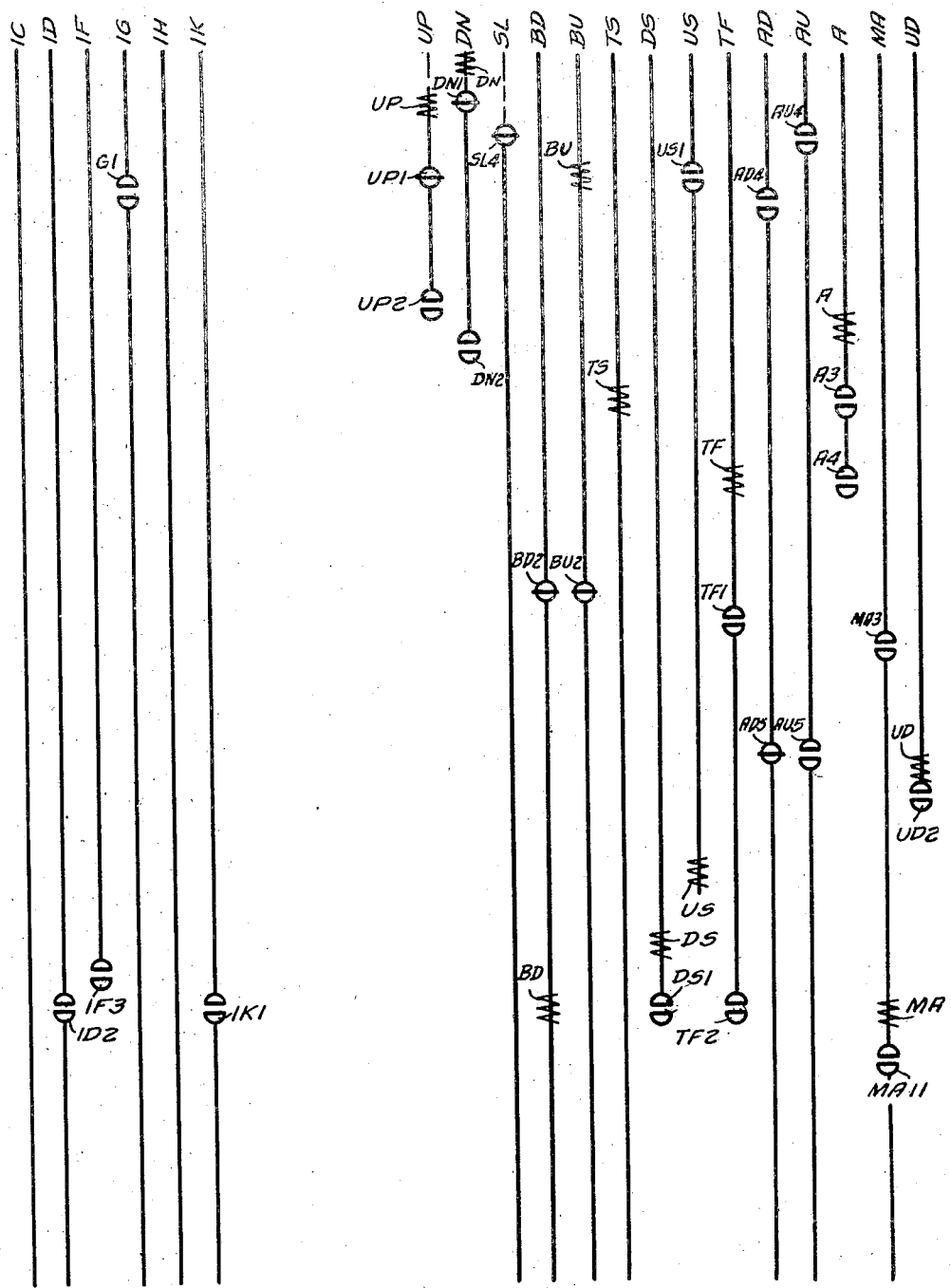
WITNESSES:                Fig. 7 and 8A.                INVENTOR
                                                      Stanley T. Hunt.
                                                            ATTORNEY April 18, 1944.   S. T. HUNT   2,347,054
ELEVATOR CONTROL SYSTEM
Filed May 13, 1942   16 Sheets-Sheet 11
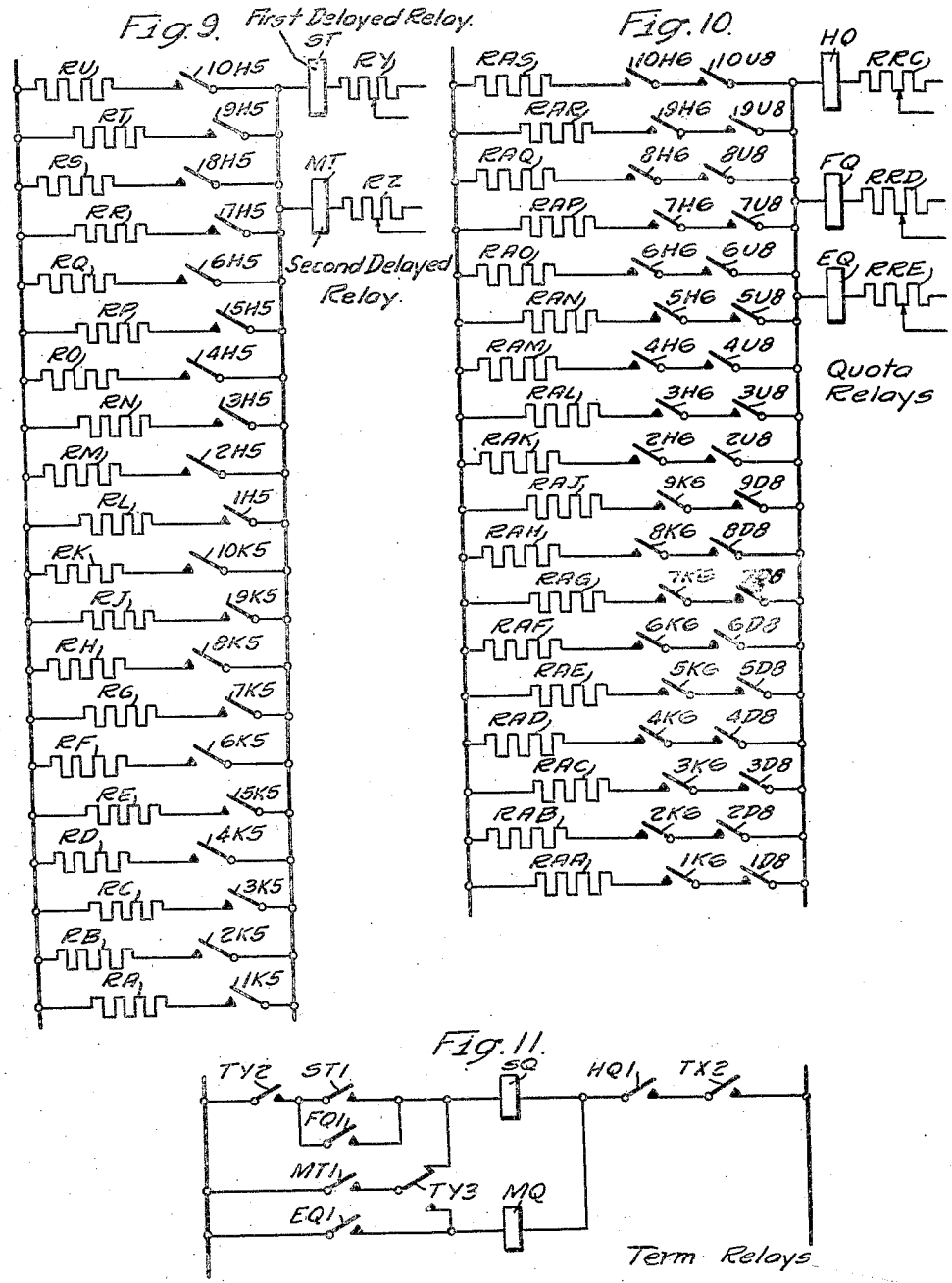

April 18, 1944.   S. T. HUNT   2,347,054
ELEVATOR CONTROL SYSTEM
Filed May 13, 1942   16 Sheets-Sheet 13
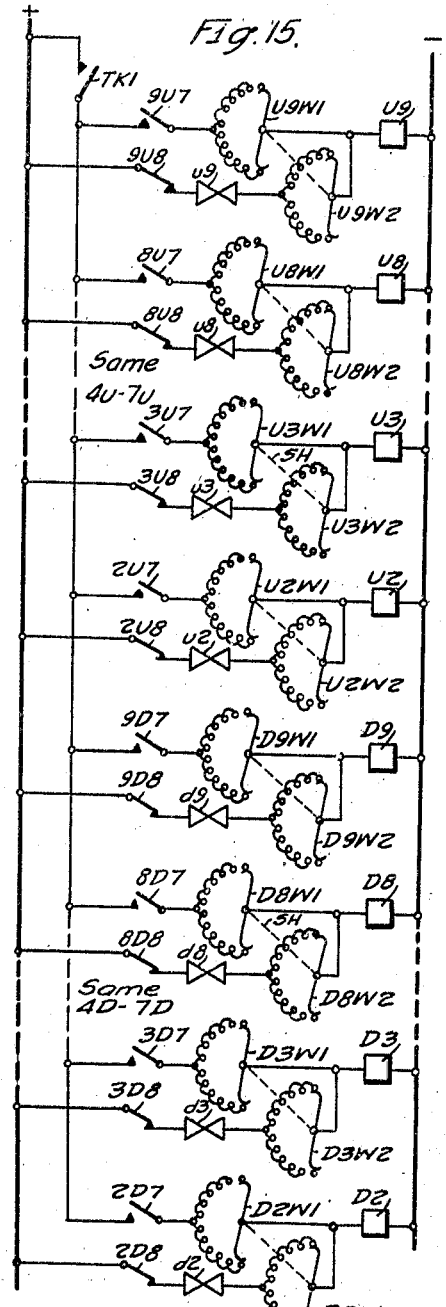
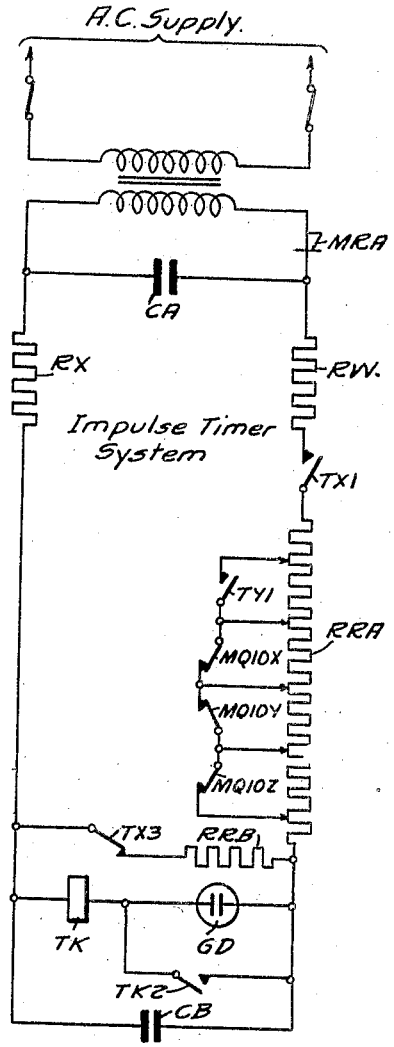
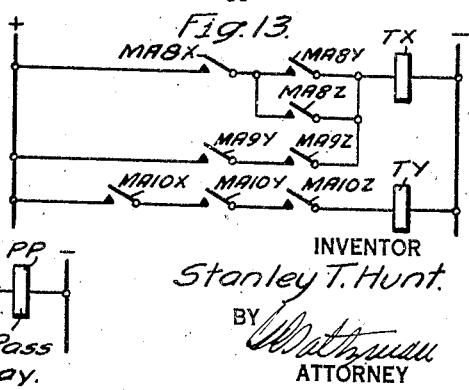
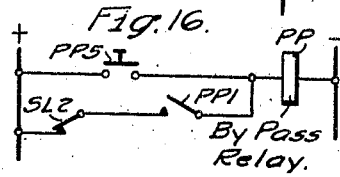
WITNESSES:
E. A. McCloskey
Birney Hines
INVENTOR
Stanley T. Hunt.
BY
ATTORNEY April 18, 1944.   S. T. HUNT   2,347,054
ELEVATOR CONTROL SYSTEM
Filed May 13, 1942   16 Sheets-Sheet 14

WITNESSES:
E. A. McCloskey.
Birney Hines

INVENTOR
Stanley T. Hunt.
BY
ATTORNEY

Patented Apr. 18, 1944

2,347,054

UNITED STATES PATENT OFFICE 2,347,054

ELEVATOR CONTROL SYSTEM

Stanley T. Hunt, Northampton, England, assignor to Express Lift Company Limited, London, England, a British company Application May 13, 1942, Serial No. 442,869
In Great Britain June 13, 1941

13 Claims. (Cl. 187—29)

My invention relates to electrical controlling systems for cars and, more particularly, to means for controlling the starting and stopping of a plurality of interconnected elevator cars.

It is the object of the present invention to provide means for automatically distributing landing calls to two or more cars so that the disparity in waiting times, whereby some of the prospective passengers are required to wait for a short period and others for a long period, is considerably reduced.

According to a feature of my invention, in an electrical car system having a plurality of interconnected cars, the cars are preferably equally spaced over their full distance of travel. By representing the full distance of travel as a circular track, and in a system having three cars, the cars would be spaced 120 degrees apart. A car so spaced with relation to the preceding car is said to be in the "desired" position. A car which, owing to traffic conditions, becomes positioned so that it is spaced, say, 160 degrees from the preceding car, is said to be in the "first delayed" position. A car which becomes spaced more than, say 210 degrees from the preceding car is said to be in the "second delayed" position. Means are provided whereby the above mentioned arbitrary spacings between a car and the preceding car are automatically adjusted according to the number of cars in service and the traffic conditions.

According to another feature of my invention, I provide means for recording the periods of time for which every unanswered landing call has been accepted. The aforesaid periods of time are classified under three headings viz: "short term," "medium term" and "long term" calls. The period of time represented by each of the three classifications may, for example, be such that the expression "short term" includes calls which have been accepted for a period not longer than 10 seconds, "medium term" includes calls which have been accepted for between 10 and 25 seconds, and "long term" includes all calls which have been accepted for a period of more than 25 seconds. The periods of time may be arranged to suit the characteristics of a particular elevator installation and may be automatically adjusted according to varying traffic conditions and/or the number of cars in service at any time.

According to a further feature of my invention, I provide means for recording the number of unanswered landing calls which has been accepted by any car. A car having accepted at least, say, three unanswered landing calls is said to have its "half quota." A car having accepted more than, say, six landing calls is said to have its "quota" and a car having accepted more than, say twelve landing calls is said to have its "excess quota." The number of calls included in each of the above three classifications can be varied to suit prevailing traffic conditions and/or the number of cars in service at any time.

(a) A car in its desired position will accept all landing calls within its zone (i. e. "short term," "medium term" and "long term" calls).

(b) A car in a "first delayed" position and having its "half quota" of calls, will refuse all "short term" calls, and will accept "medium term" and "long term" calls.

(c) A car in a "second delayed" position and having its "half quota" of calls will refuse "short term" and "medium term" calls, and will accept "long term" calls.

(d) A car having its "quota" of calls will refuse "short term" calls, and will accept "medium term" and "long term" calls.

(e) A car having an "excess quota" of calls will refuse "short term" and "medium term" calls, and will accept "long term" calls.

The following further features are incorporated in my invention:

(f) An illuminated signal or the like is provided at the principal or parking floor (usually the ground floor) above the entrance to each car. The said signal is illuminated upon the arrival of its associated car, provided that no other car is waiting at that floor. If more than one car arrives at the parking floor, only the signal associated with the first car to arrive will be illuminated. Upon departure of the first car, the signal associated with the second car will be illuminated.

(g) When no car is standing at the parking floor, the car in the zone in which the parking floor is situated at the appointed time, will travel to the parking floor when all its landing calls have been answered.

(h) When the car to which a call has been assigned, fails to start or, after starting, comes to rest for a period of time in excess of a predetermined period, the landing calls which the lift car has accepted but not answered, are transferred to other cars according to the positions of the latter in relation to the calls.

(j) Although the system may be fully automatic, it is understood that, in accordance with general practice in elevator systems of this type, each car may be placed under the control of an attendant. The attendant, however, merely starts the car by operating a starting handle or the like in response to a signal which indicates that a call exists within the operating zone of his car. The system otherwise operates automatically according to the manner already described.

When a car is under the initial control of an attendant, a by-pass button is provided by means of which unnecessary delays due to a fully loaded car stopping in response to landing calls are prevented. The "by-pass" button is momentarily operated by the attendant when the car is fully loaded, whereupon the car will not stop to answer any landing calls until after it has stopped to deliver a passenger. The car will then revert to the normal method of operation which existed before the by-pass button was operated. It is, therefore, not necessary for the attendant to maintain the "by-pass" button switch operated, and the difficulty which would arise if a locking type of switch were used viz.: that of inadvertently allowing the switch to remain in the by-pass position, is avoided.

In an arrangement according to one embodiment of my invention, "up" and "down" landing calls are accepted on a controlling device, which is common to all cars, and are distributed to the cars according to the floor from which a call is originated, the direction in which the caller intends to travel, the positions of the cars, and the direction in which they are travelling.

To facilitate the even distribution of landing calls, "up" and "down" registering mechanisms are provided at each floor to record the acceptance of a call and to classify the call according to the length of time the call has been accepted. For this purpose, an impulse producing mechanism, common to all the cars, periodically steps the appropriate registering mechanism on floors from which calls have been accepted. Depending, therefore, upon the number of steps taken by the registering mechanism, a call is classified and assigned to a car. The period of time elapsing between the periodic stepping of the registering mechanism by the impulse producing mechanism is dependent upon the number of cars in service and the number of cars in excess of a predetermined number which are in a "first" or "second delayed" position and/or have an excess quota of unanswered calls.

In order that the nature of my said invention may be more completely described and ascertained, reference should now be made to the accompanying drawings in which the Figures 1 to 16 are circuit diagrams for a three car elevator system serving ten floors, and the Figures 1A to 16A are key diagrams of Figs. 1 to 16.

In reading the drawings, the key sheets should be placed at the right of the wiring circuits, when it will be found that the coils of the relays and their contacts are in horizontal alinement in both sets of drawings. The cars are designated X, Y and Z. The relays individual to the cars are shown for car X. The corresponding relays for cars Y and Z are given the same designation plus the letter Y or Z as the case may be.

The functions of the relays and their designations are as follows:

1C to 10C (Fig. 1), Car call storage relays.
2U to 19U (Fig. 2), "Up" landing call storage relays.
1D to 9D (Fig. 2), "Down" landing call storage relays.
1F to 10F (Fig. 3), Floor selector relays.
1G to 10G (Fig. 5), Floor position relays.
1H to 10H (Fig. 3), "Up" zone relays.
1K to 10K (Fig. 5), "Down" zone relays.
A (Fig. 8), Lift running relay.
UP (Fig. 8), "Up" contactor.
DN (Fig. 8), "Down" contactor.
AU (Fig. 6), "Up" direction relay.
AD (Fig. 6), "Down" direction relay.
BU (Fig. 7), Initial "up" direction relay for landing calls.
BD (Fig. 7), Initial "down" direction relay for landing calls.
G (Fig. 8), Lift gate relay.
UD (Fig. 8), Auxiliary to AU and AD.
US (Fig. 8), "Up" terminal limit relay.
DS (Fig. 8), "Down" terminal limit relay.
PP (Fig. 16), Pass relay.
TS (Fig. 8), Stopping time interval relay.
TF (Fig. 8), Starting failure relay.
MA (Fig. 8), Out of service relay.
S (Fig. 3), Stationary contacts on floor selector.
SL (Fig. 14), Slow down relay.
SR (Fig. 8), Stopping inductor contacts.
TK (Fig. 12), Landing call pulse timing relay.
TX (Fig. 13), Pulse timing cut-off relay.
TY (Fig. 13), Pulse time regulating relay.
ST (Fig. 9), "First delayed" position relay.
MT (Fig. 9), "Second delayed" position relay.
HQ (Fig. 10), "Half quota" relay.
FQ (Fig. 10), "Full quota" relay.
EQ (Fig. 10), "Excess quota" relay.
SQ (Fig. 11), "Short term" call relay.
MQ (Fig. 11), "Medium term" call relay.
U2 to U9 (Fig. 15), Driving magnets of "up" landing call timing switches.
D2 to D9 (Fig. 15), Driving magnets of "down" landing call time switches.

Figure 1:
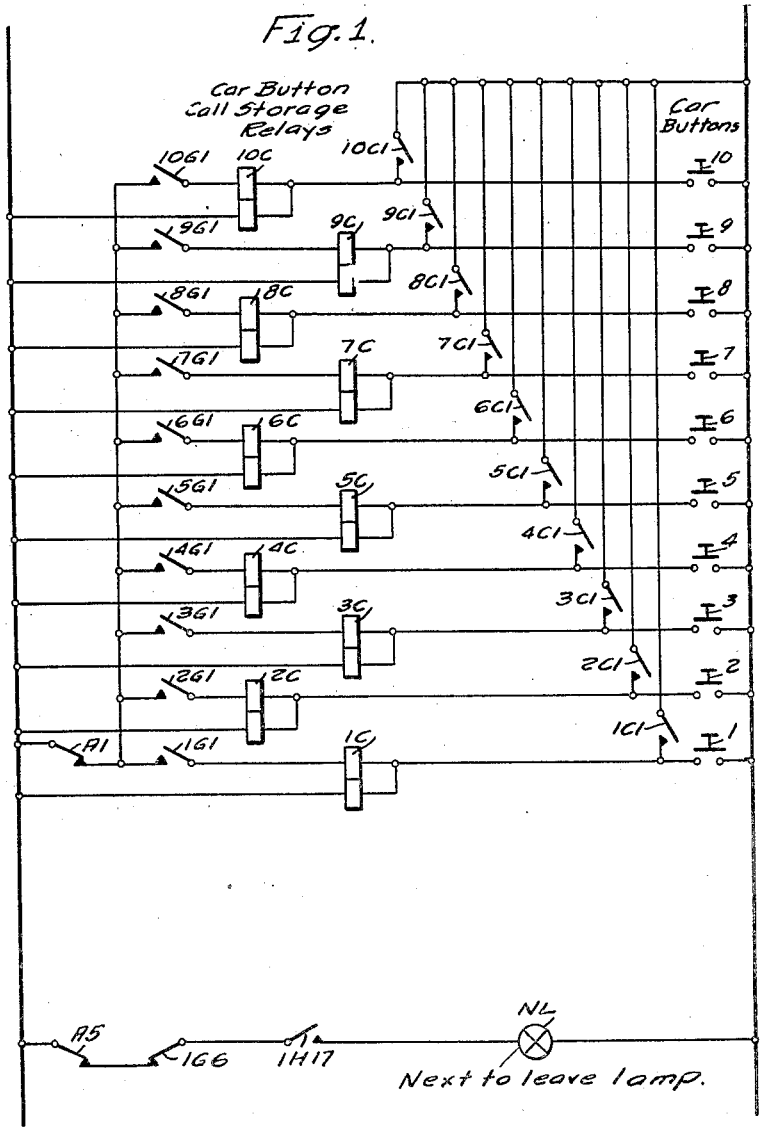
Figure 1A:
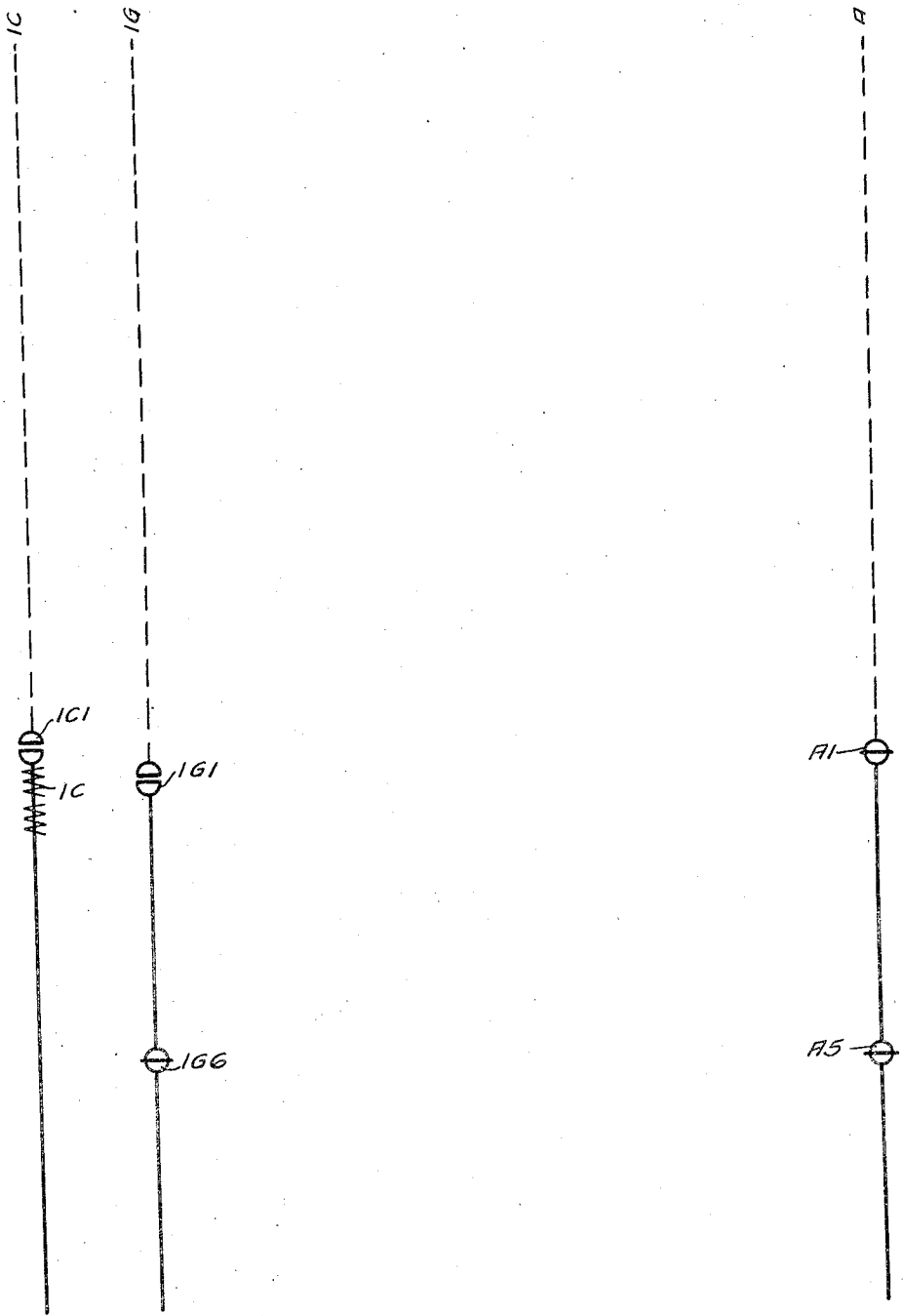

In Figure 1 is shown the car call storage relay group, one such group being associated with each of the three cars. One storage relay is provided for each of the ten floors. When the stop button in the car for floor 6 is operated, the corresponding car call storing relay 6C operates to store or register the call. The relay is released by energizing its second winding when the car stops at floor 6, the connection to the two windings of the relay being such that current flows in opposite directions.

A lamp NL which, when illuminated, indicates that the car is the next one to leave, is fitted above the entrance to each car at floor 1. The lamp is employed in connection with a feature whereby, when a car having floor 1 in its zone, has no further calls, it is parked at that floor. This feature is explained in connection with Figure 2 later in this specification. As described in connection with the zone relays (Figs. 3 and 5) later in the specification, up zone relay 1H operates when floor 1 is in the zone of the car, and the relay can only be operated for one car at a time. When the car reaches floor 1, car running relays A and floor position relay 1G are unoperated and up zone relay 1H is operated, provided no other car is already at that floor, and its "next to leave" lamp NL is illuminated.

Figure 2:
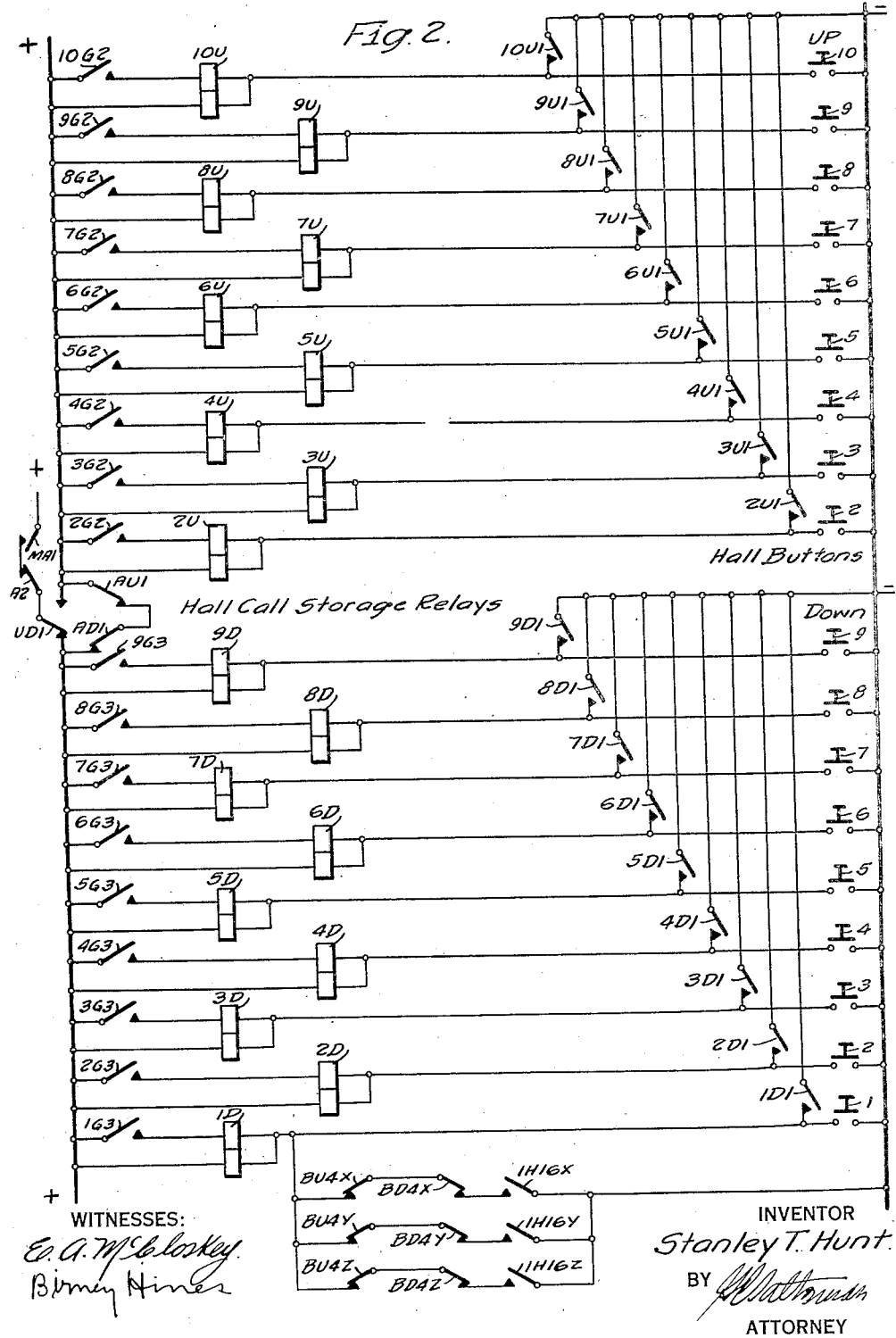
Figure 2A:
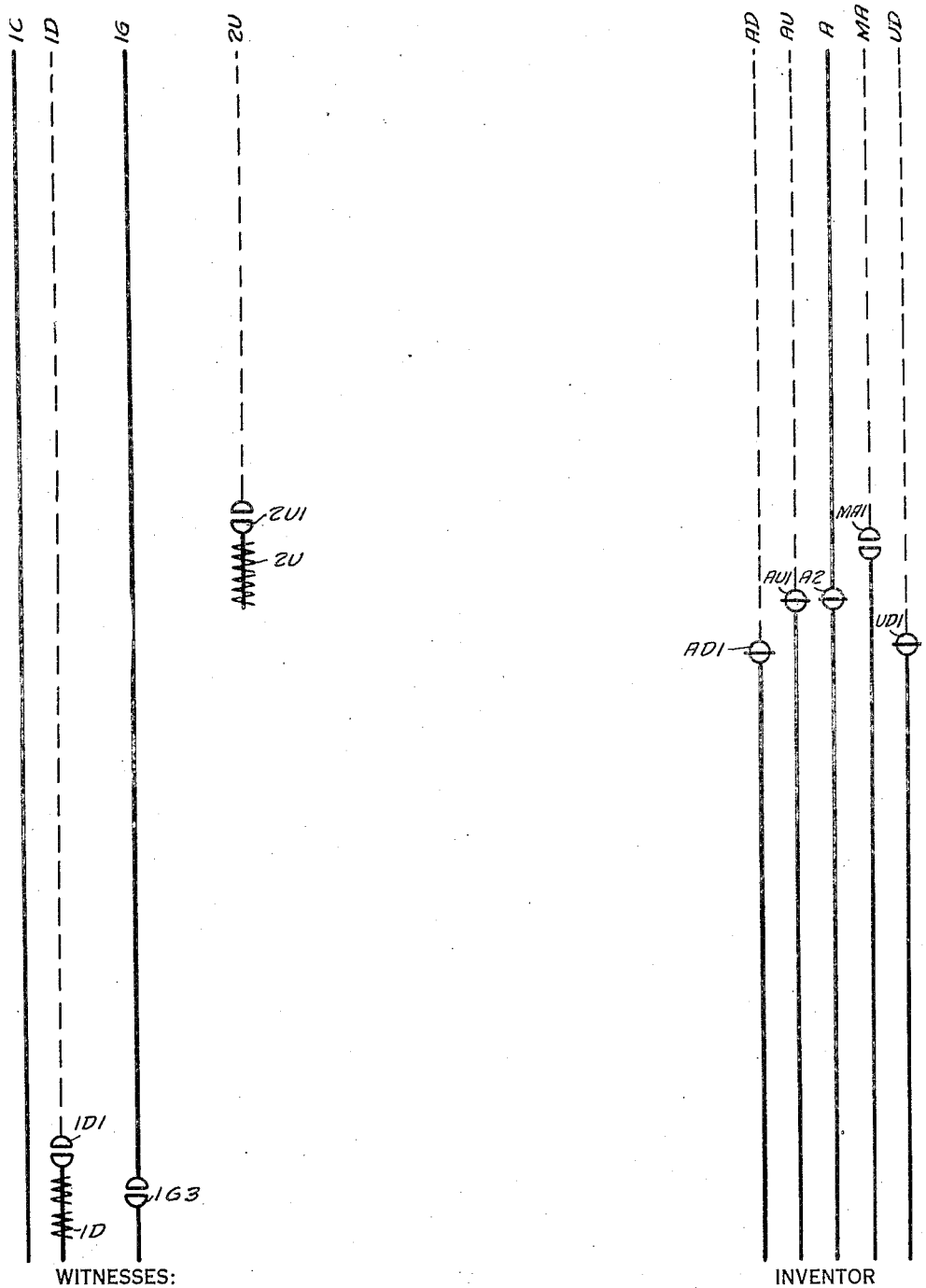

In Figure 2 is shown the hall landing call storage relay group which is common to all three cars. On each of the floors 2 to 9 are provided "up" and "down" push buttons. Only one push button is provided at the bottom landing at floor 1 and at the top landing at floor 10 for obvious reasons. The top landing button is called an up button because the cars must go up to answer it, while the bottom button is called a down button because the cars must go down to answer it. A call storage relay is associated with each floor push button. A prospective passenger at floor 3 wishing to travel up, operates the "up" landing push button 3 whereupon relay 3U operates, whilst a prospective passenger at floor 6 wishing to travel down, operates the "down" landing push button 6 to operate relay 6D. A landing call relay is released when a car stops at the appropriate floor from the corresponding direction, the second winding of the relay being energized to neutralize the magnetic flux created by the first winding.

The operation of a landing call storage relay originates circuit operations for bringing a car to the corresponding floor.

When a car having floor 1 in its zone has no further calls, contacts BU4, BD4 and IH16 (explained later in this specification) complete a circuit for the down landing call storage relay 1D which causes the car to travel to floor 1 and park in that position until it is required to answer further calls in its zone.

Figure 3:
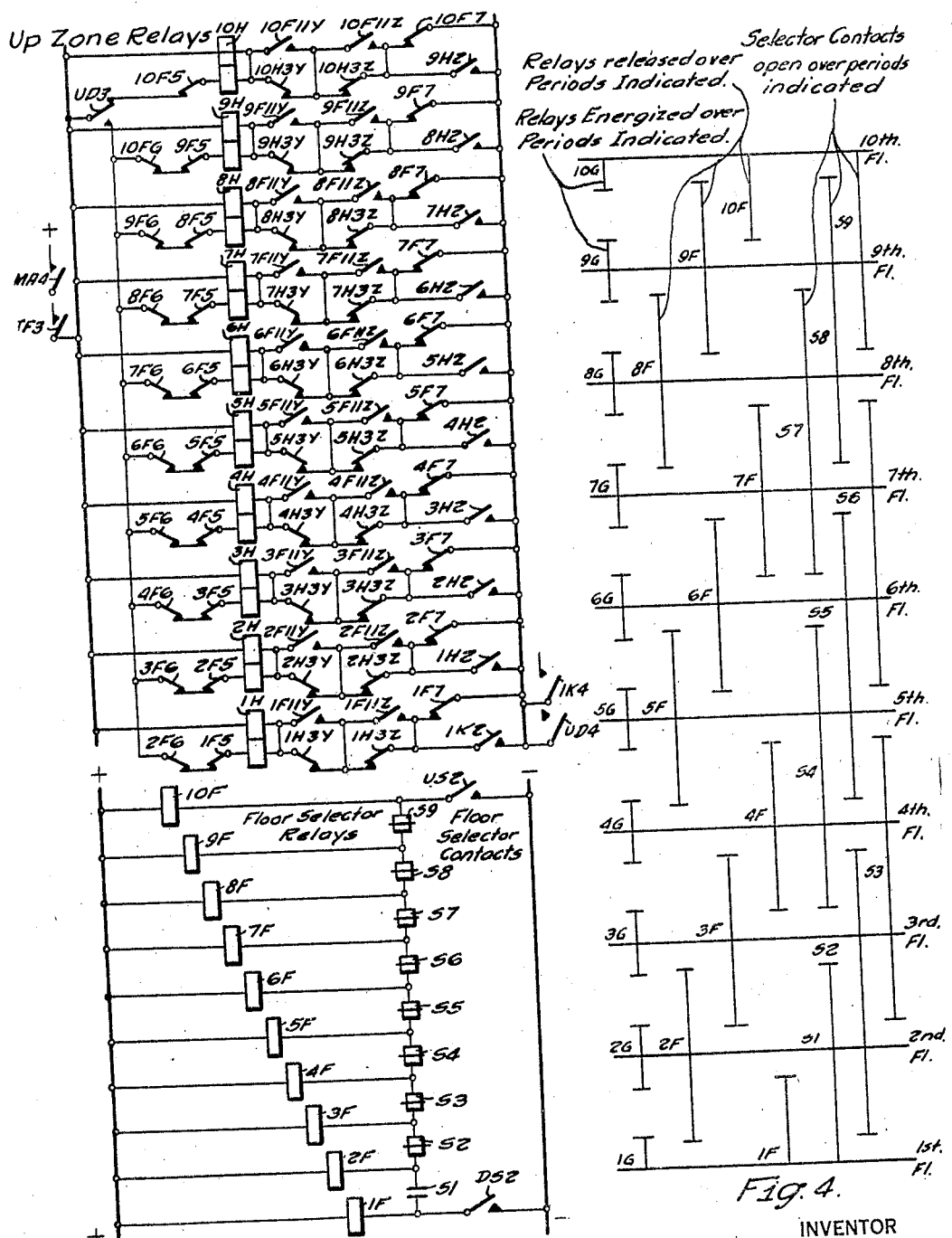
Figure 4:
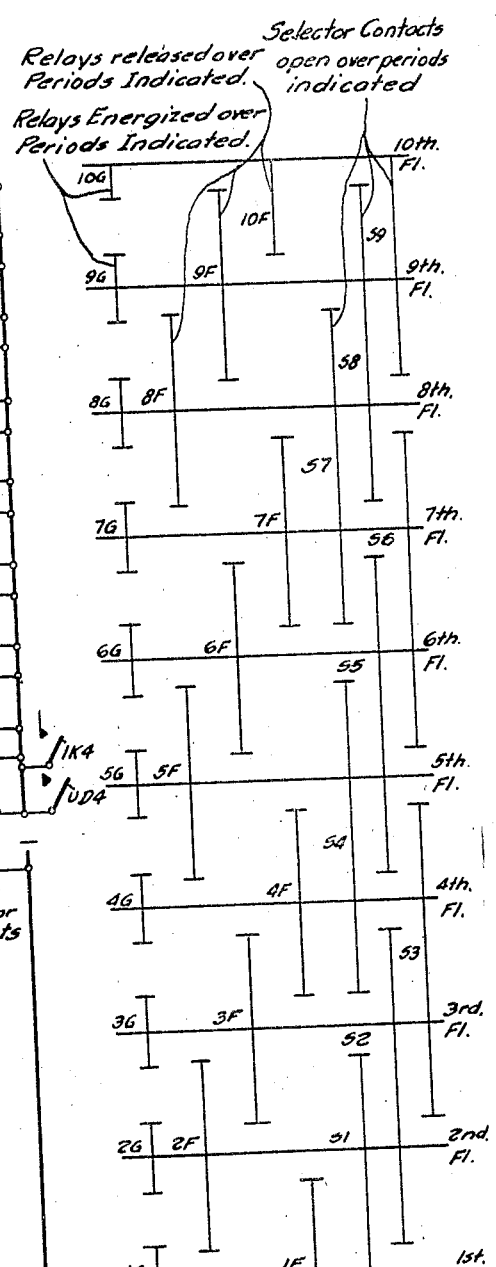
Figure 3A:
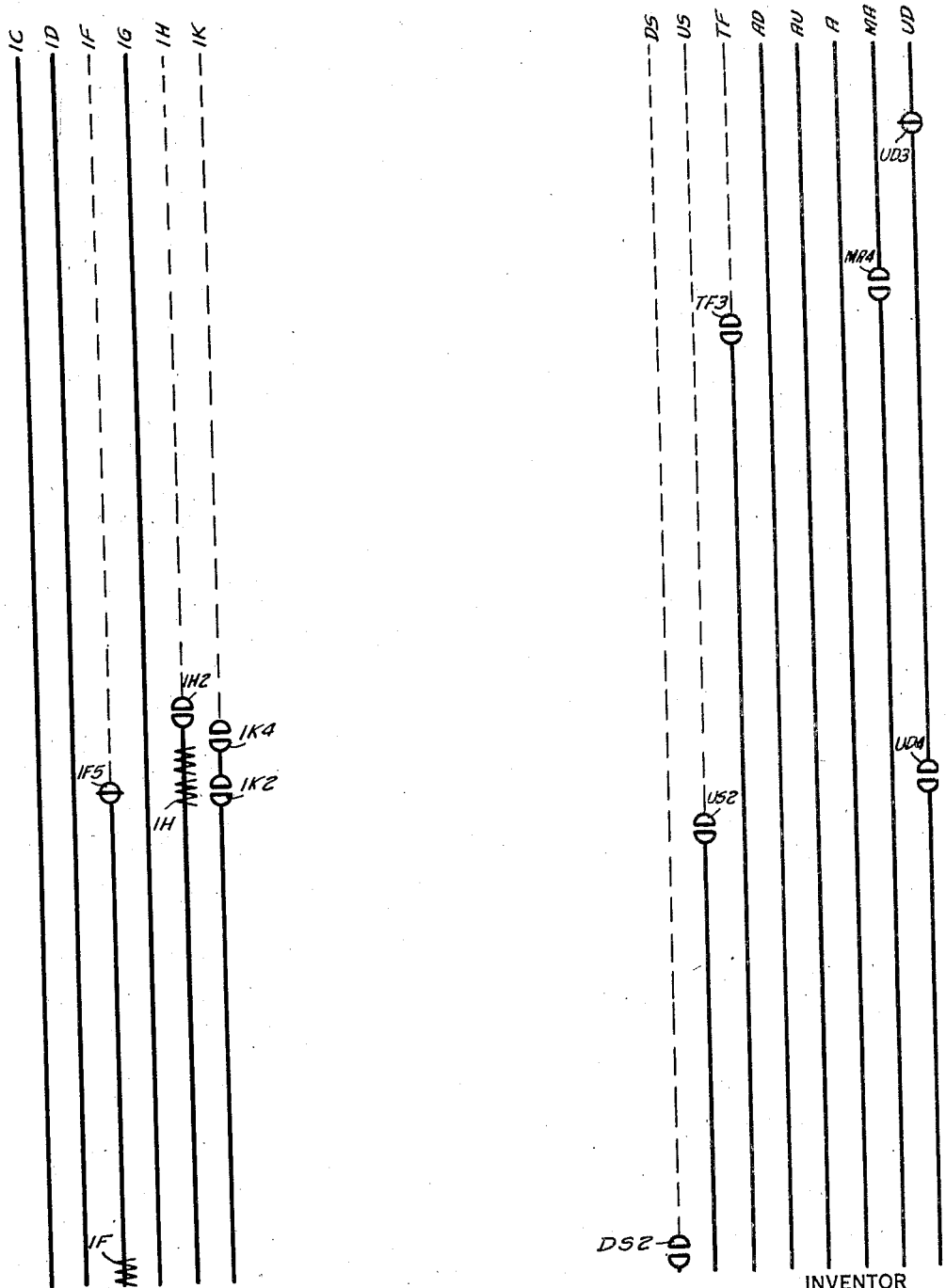
Figures 5, 6A:
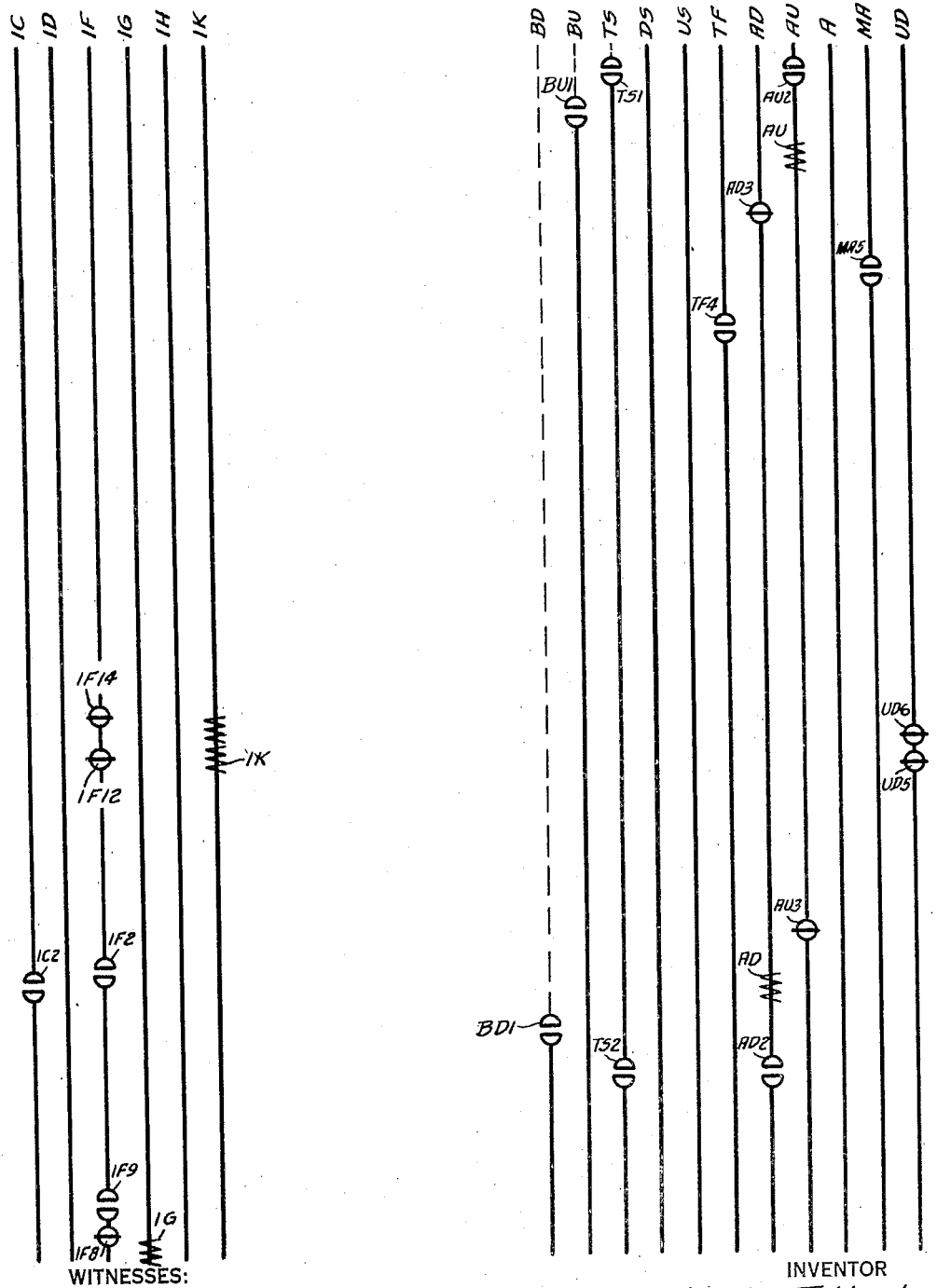

In Figs. 3 and 5 the floor selector relays 1F to 10F are controlled by means of the contacts S1 to S9 on a floor selector arranged to be actuated as the car travels between the various floors. The floor position relays 1G to 10G are controlled by the contacts of the floor selector relays 1F to 10F. The periods during which contacts S1 to S9 are opened, relays 1F to 10F are released, and relays 1G to 10G are operated according to the position of a car, are shown in Fig. 4.

In the particular embodiment of my invention shown in the drawings, the cars answer calls in their respective operating zones according to the circular track principle.

The operating zone of a car is indicated by means of the "up" and "down" zone relays 1H to 10H and 1K to 10K respectively; the relays for a particular car being interconnected with contacts of similar relays on all three cars. If a car is travelling in an upward direction, it will have operated the H relay corresponding to the floor at which it is positioned and the H relays corresponding to all floors between itself and the car ahead traveling in the same direction. If the car immediately ahead of it, according to the circular track principle, is travelling in the down direction, the up-zone H relays corresponding to all floors above the car will be operated, together with the down relays in the 1K to 10K group corresonding to all floors above the car ahead, thus the zone extends up to the upper terminal and down to the car ahead.

Similarly, a car travelling in the down direction will have its down zone relays K operated corresponding to the floors between it and the next car ahead of it. If the latter car is travelling in the up direction, the first car will have all its down K relays operated corresponding to all the floors below it, together with the up H relays corresponding to all floors below the car ahead; that is, the zone will extend down to the lower terminal and up to the nearest up car.

When a car leaves a floor, the corresponding H or K zone relay for that car will release and will operate in the equipment of the car in the following zone.

If a car reverses its direction of travel so that it becomes positioned behind a different car to that which it has previously been positioned, the H and K zone relays of all cars are corrected to correspond to the revised positions of the cars.

When two cars become similarly positioned while both are travelling in the same direction, the H or K zone relay will remain operated for the first car to arrive at that position, the relay associated with the second car not operating until the first named car is ahead of it. If, however, the second car overtakes the first car, the H or K zone relay for the second car will operate and the equivalent relay for the first car will release.

Assuming that car X is at floor 2 travelling in an upward direction, auxiliary relay UD will be operated because a call has been received from a floor above the position of the car. Floor selector relays 1F and 3F to 10F will be operated (relay 2F is not operated because contacts S1 and S2 are open). Assuming also that cars Y and Z are out of service, a circuit is completed for the upper winding of up zone relay 2H from positive, operated MA4 and TF3 (the operation of these relays is dealt with later), upper winding of relay 2H, normal 2H3(Y), 2H3(Z), 2F7 and operated UD4 to negative. Operated 2H2 completes a similar circuit for relay 3H, 3H2 then completes a circuit for relay 4H and so on up to relay 10H.

Operated 10H4 and 10H2 now complete a circuit for relay 10K; 10K2 operates relay 9K and so on to relay 1K. 1K2 operates relay 1H.

Car X has, therefore, an operating zone extending over the full circular track.

If car Y is brought into service at a floor above that at which car X is positioned (floor 2), and if car Y travels upwards, a circuit will be completed for its up zone H relay corresponding to the floor at which it is positioned and the operation of the relay will open the circuit of the corresponding zone relay for car X, the latter relay then releasing the H and K relays corresponding to the floors beyond car Y. Zone relays for car Y equivalent to those released for car X will be operated, the circuit operation being as described for car X.

If car Z is brought into service and is travelling downwards at floor 5, its down zone relay 5K will operate and release relays 5K to 1K and relay 1H for car X, the equivalent relays operating for car Z.

When a car leaves a floor, the circuit of the lower winding of the corresponding H or K zone relay is closed. This winding is connected in opposition to the upper winding and the relay releases. If, for example, car X moves upwards from the second floor, floor selector relay 3F releases. Since relay 2F is also released, normal contacts 3F6 and 2F5 energize the lower winding of relay 2H via operated UD3. When relay 2H releases, contacts 2H2 open one circuit of relay 3H, but a hold circuit is maintained by normal 3F7.

Normal 2H3(X) for the car Z equipment operates relay 2H for car Z and floor 2 is consequently transferred from the zone of car X to that of car Z.

As already mentioned, if a car reverses its direction of travel, all the floors between its position and the car previously ahead of it are released and are operated for the car which was behind it. If, for example, car Y which is at floor 8 reverses to travel downwards, auxiliary relay UD releases. The negative feed to all the H up zone relays is opened at UD4 and a circuit is closed for the K down zone relays at normal UD6. On car Y, zone relays 8H, 9H, 10H, 10K and 9K release, the circuit of up zone relay 8H being maintained by normal 8F14.

The release of relay 8H for car Y allows 8H3(Y) to operate relay 8H for car X, the latter relay then operating up zone relay 9H. The zone relays 10H, 10K and 9K also operate for car X.

In Fig. 4, as stated above, is shown the periods during which selector contacts S1 to S9 are opened, floor selector relays 1F to 10F are released and floor position relays 1G to 10G are operated.

In Fig. 7, initial direction landing call relays BU and BD operate according to whether a landing call is above or below the position of the car. If a call is registered at a position above the car, relay BU operates. If a call is registered at a position below the car, relay BD operates.

As already explained, the operating zone of a car is indicated by the operation of the zone relays in the 1H to 10H and 1K to 10K group. Contacts in the groups 2H1 to 10H1 and 1K1 to 9K1 are accordingly operated in the circuits of relays BU and BD. All the contacts in the 1F3 to 10F3 group will be operated with the exception of the contacts of the relay corresponding to the position of the car, therefore, the contacts of all landing call relays 1D to 9D and 2U to 10U, and contacts of the zone relays 1H to 10H and 1K to 10K above the point at which a contact in the 1F3 to 10F3 group is opened, will operate relay BU and all contacts below that point will operate relay BD.

If calls exist above and below the car, and such calls are in the zone of the car, both BU and BD will operate.

Relays US and DS are released at the upper and lower terminal floors, respectively, by contacts UL1 and DL1 of the "up" and "down" limit switches.

Figure 8:
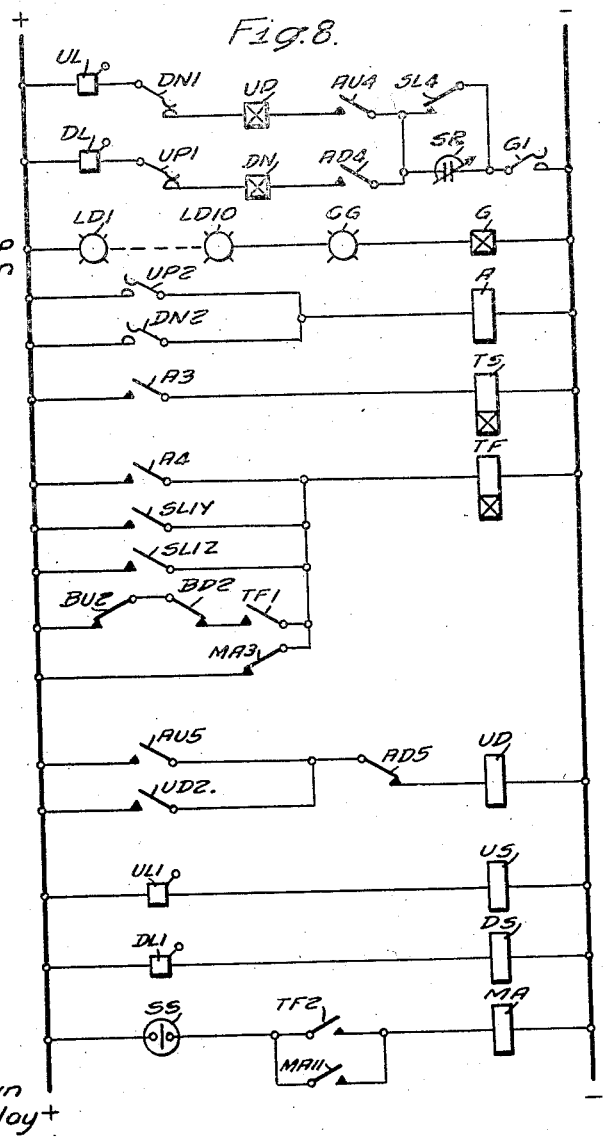

In Figs. 7 and 8, relays AU and AD are operated firstly under the control of car calls above or below the car respectively, in a manner similar to that already described for the operation of relays BU and BD. Contacts 1C2 to 10C2 of the car call storage relays close a positive feed to the contact chain comprising contacts 1F1 to 10F1. Contacts AD3 and AU3, in the negative feeds to relays AU and AD respectively, ensure that only one of the relays can be operated at the same time. Secondly, relays AU and AD are also controlled with regard to landing calls by BU1 and BD1. Once operated, relays AU and AD hold via AU2 and TS1 and AD2 and TS2, respectively, the contacts of relays TS remaining closed for a predetermined period of time after the car has come to rest at a floor.

Contacts AU4 control the "up" contactor UP, and AD4 control the "down" contactor DN. The contactor relays UP and DN operate the usual control system of the car to cause it to run up or down and inasmuch as control systems are old and well known, no further description will be given. It will be seen, therefore, that the operation of relay AU or AD causes the car to move up or down to answer landing calls within the operating zone of the car, and also to deliver car call passengers.

Stopping time interval relay TS is operated by contact A3 of lift-running relay A which indicates that the car is running and is controlled by contacts UP2 and DN2. Relay TS remains operated for a predetermined period after its circuit is opened by A3.

Relay TF is the starting failure relay which is operated when the battery supply is switched on. Operated TF1 provides a holding circuit in series with normal contacts BU2 and BD2.

When the car is scheduled to start in response to landing calls, relay BU and BD operate whereupon BU2 or BD2 open the circuit of relay TF (MA3 is open at this time as explained later). If the car moves, relay A operates and A4 holds relay TF. If, however, the car fails to move, relay A will not operate and relay TF will release at the end of its predetermined release period. Contacts TF3 and TF4 release relays 1H to 10H and 1K to 10K, consequently the car loses its operating zone which is transferred to the following car.

The starting failure relay TF remains released until one of the other cars commences to slow down. Contacts SL1 of slow down relay SL on the other car then reoperates relay TF.

Out of service relay MA, which operates when the service switch SS is closed and relay TF is operated, remains held via MA11. When it is necessary to withdraw the car from service for maintenance or other purpose, the service switch is opened and relay MA releases. Contacts MA4 and MA5 open the circuits of relays 1H to 10H and 1K to 10K, thereby transferring the zone of the car to the following car.

Auxiliary relay UD operates via AU5 and normal AD5 when the car is operating in an upward direction. Operated UD2 provides a hold circuit for the relay until AD5 opens when the car is required to travel downwards. Contacts of the auxiliary relay UD control zone relays 1H to 10H and 1K to 10K as explained earlier in the specification under the description of Figs. 3 and 5.

Figures 9, 10, 11A:
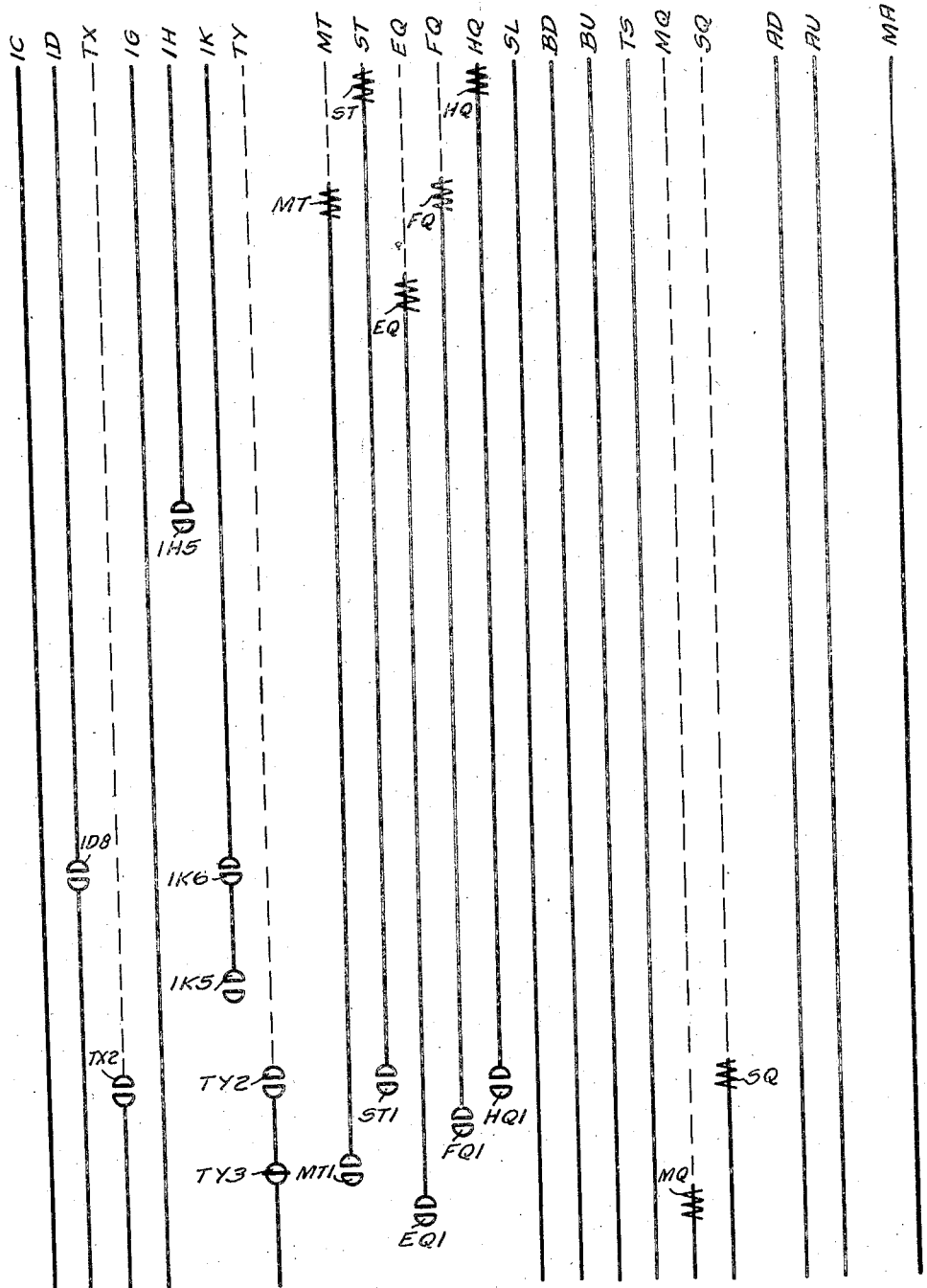

In Figs. 9, 10 and 11, relays ST and MT operate according to whether the car is in the "first delayed" or "second delayed" position.

In a ten-floor elevator installation, the total number of "up" and "down" zone relays for the full car travel is 18. When referring, therefore, to a three car system in which the distances between the cars are substantially equal (i. e. in which the operating zones of all cars are equal), a car referred to as being in the "desired" position would have 6 or 7 zone relays operated. As a car zone becomes extended owing to traffic conditions, the number of its zone relays operated will increase. When the number of operated zone relays exceeds a desired predetermined number, the car is said to be in the "first delayed" position and the "first delayed" relay ST operates. If the car becomes further delayed so that the number of operated zone relays exceed a greater predetermined number, the car is said to be in the "second delayed" position and the "second delayed" relay MT operates.

The current flowing through relays ST and MT is proportional to the number of 1K5 to 10K5 and 1H5 to 10H5 zone relay contacts operated, all the resistances RA to RU being of equal value. Hence when a selected predetermined number of zone relays for a car are operated, sufficient current flows through the resistances connected in parallel by the operated zone relay contacts to operate the relay ST and condition the circuits in accordance with the "first delayed" position of that car. Similarly, when a greater predetermined number of zone relays for a car are operated, sufficient current flows through the "second delayed" relay MT to operate it to condition the circuits in accordance with the "second delayed" position of that car. The resistances RY and RZ provide means by which the relays ST and MT may be readily adjusted for the desired action.

The "half quota" relay HQ, the "full quota" relay FQ and the "excess quota" relay EQ are controlled in a similar manner to relays ST and MT, but in this case contacts 2U8 and/or 2D8, etc. of the landing call relays are connected in series with contacts 2H6 and/or 2K6, etc. of the zone relays and resistances RAA to RAS so that relays HQ, FQ and EQ are operated according to the number of floors in the zone of the car from which calls are registered. The operation of relay HQ indicates that the number of calls registered in the zone of the car is of a predetermined number referred to as a "half quota." Relay FQ indicates a "full quota" and relay EQ an "excess" quota.

A plurality of term devices such as the "short term" call relay SQ and the "medium term" call relay MQ operate to allow the car to pass "short term" and "medium term" calls respectively under certain conditions as will be explained below.

The negative feed to relays SQ and MQ includes contacts HQI and TX2, the former contact indicating that the car has at least its "half quota" of calls in its zone, and the latter (as will be explained later) indicating that at least two cars are in service.

The circuit to relay SQ is completed via operated TY2 and ST1 or FQ1, ST1 operating when the car is in the "first delayed" position, and FQ1 operating when the car has its "full quota" of calls. Relay MQ is controlled by operated MT1 or EQ1, indicating that the car is in the "second delayed" position or has its "excess quota" of calls.

When less than three cars are in service, pulse time regulating relay TY releases whereupon its contacts TY2 and TY3 transfer relay SQ to the control of MT1.

Summarizing the above operations:

When three cars are in service, a car passes "short term" calls when in the "first delayed" position or when it has its "full quota" of calls. When, however, only two cars are in service, "short term" calls are passed by a car in the "second delayed" position, the reason for this being that with one or more cars out of service the predetermined spacing between cars, in order to maintain even distribution, should be increased. The "first delayed" position is, therefore, dispensed with by rendering ST1 ineffective, its function being performed by MT1 when the car is in the "second delayed" position. This arrangement in effect increases the number of floors in the zones of the remaining cars before they become in a delayed position for the purpose of passing calls.

Figures 12, 13, 16A:
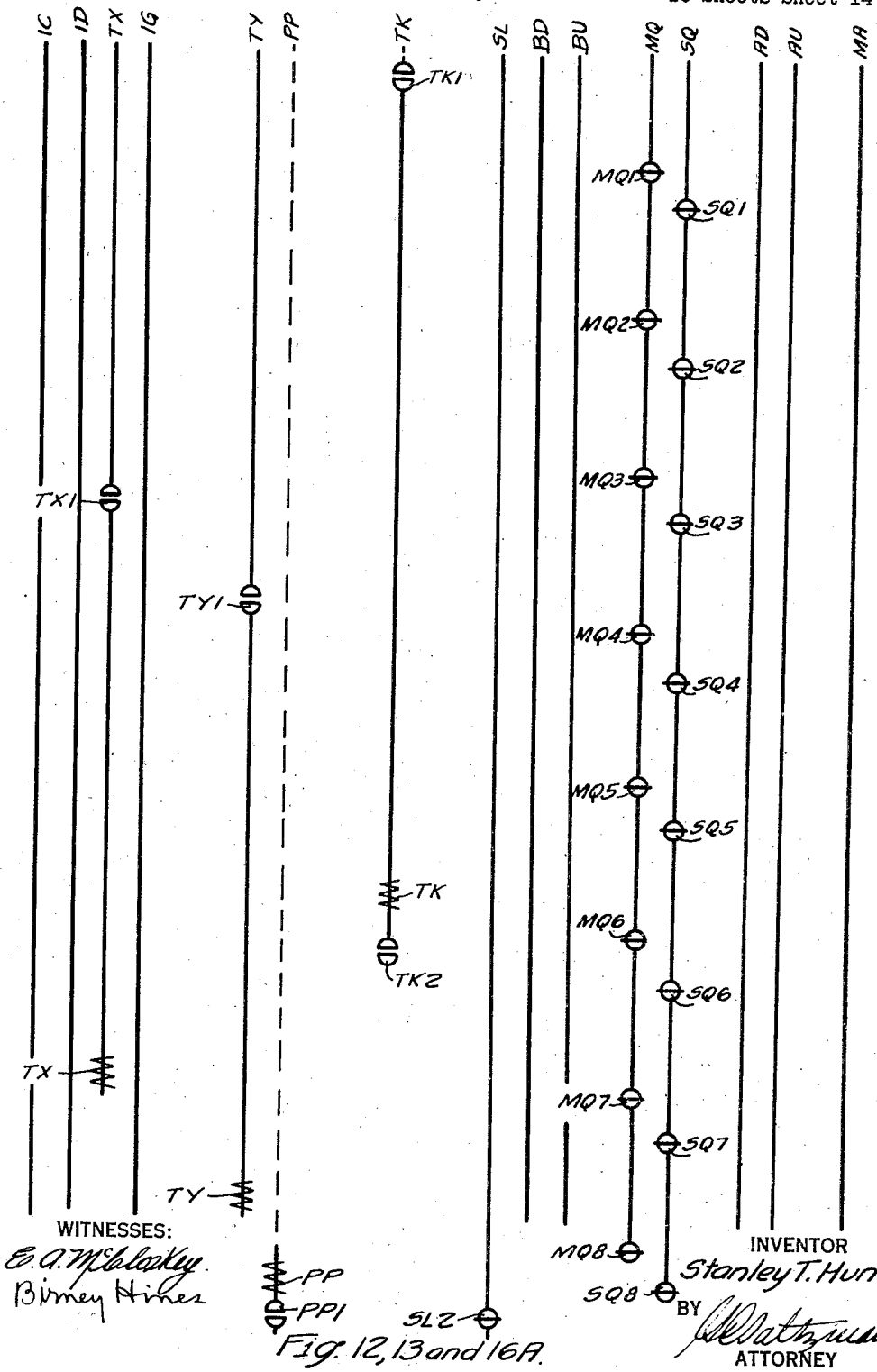

In Fig. 13, the pulse timing cut off relay TX is operated when at least two cars are in service. It is released to disconnect the timing of landing calls (a feature to be explained later) and to disconnect relays SQ and MQ when only one car is in service. The single car must then answer all calls.

The pulse time regulating relay TY operates when all three cars are in service.

In Fig. 12, an impulse timing device which includes a gas-discharge tube GD in series with the landing call pulse timing relay TK is arranged so that an alternating current supply, rectified by means of the metal rectifier MRA and smoothed by the condenser CA, supplies a direct current potential to the terminals of the condenser CB in series with resistances RW, RX and RRA. Resistance RRA is short-circuited by operated TY1. The condenser charges until the voltage across its terminals reaches the striking voltage of the gas-discharge tube, whereupon the condenser discharges through the tube and relay TK which operates. Relay TK holds momentarily via TK2 and these contacts provide a discharge circuit for the condenser. The relay now releases and the process is repeated.

Contacts TK1 provide an impulsing circuit for the timing mechanisms shown in Fig. 15.

The timing device is only required when two or more cars are in service, and the charging circuit is, therefore controlled by contact TX1. When relay TX releases, TX1 disconnects the charging circuit and TX3 discharges the condenser.

While two or more cars are in service, the impulse or timing device operates continuously so that any time a hall stop call is registered the impulses from the timing device cause the selector switch to start counting time at once.

When one car is out of service, contact TY1 in the charging circuit releases and removes the short-circuit from a portion of resistance RRA, thereby increasing the impulsing period. Furthermore, when a car has its "second delayed" relay MQ operated, operated MQ10 inserts additional resistance in the charging circuit to increase the impulsing period. This increases the range of "short term" and "medium term" calls when a car is in the "second delayed" position or has an "excess quota" of calls.

Any predetermined length of timing impulse desired may be selected by properly choosing the elements in the device and then that selected length of impulse is varied by the resistors RRA, as described.

Figure 14:
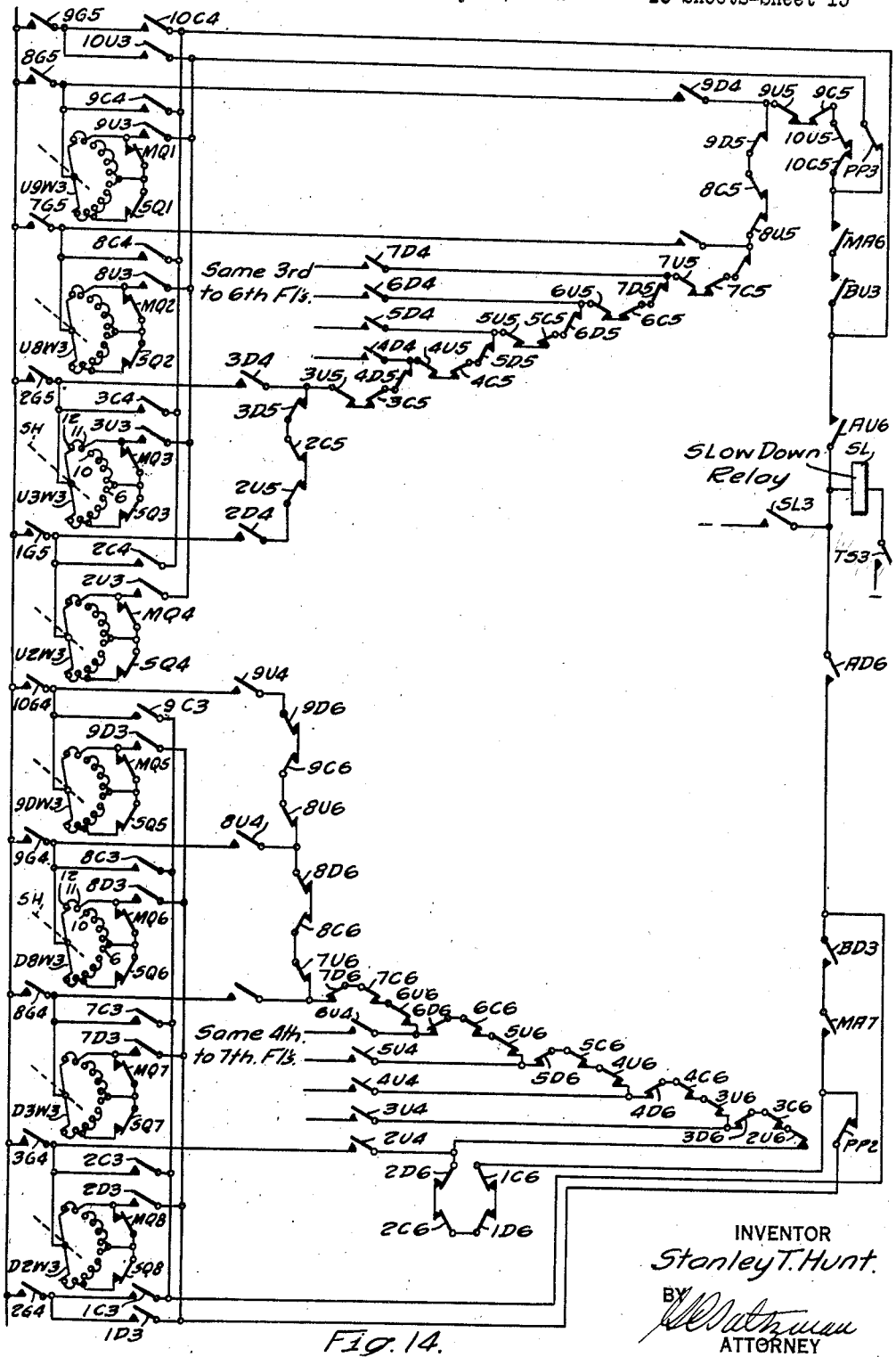
Figure 14A:
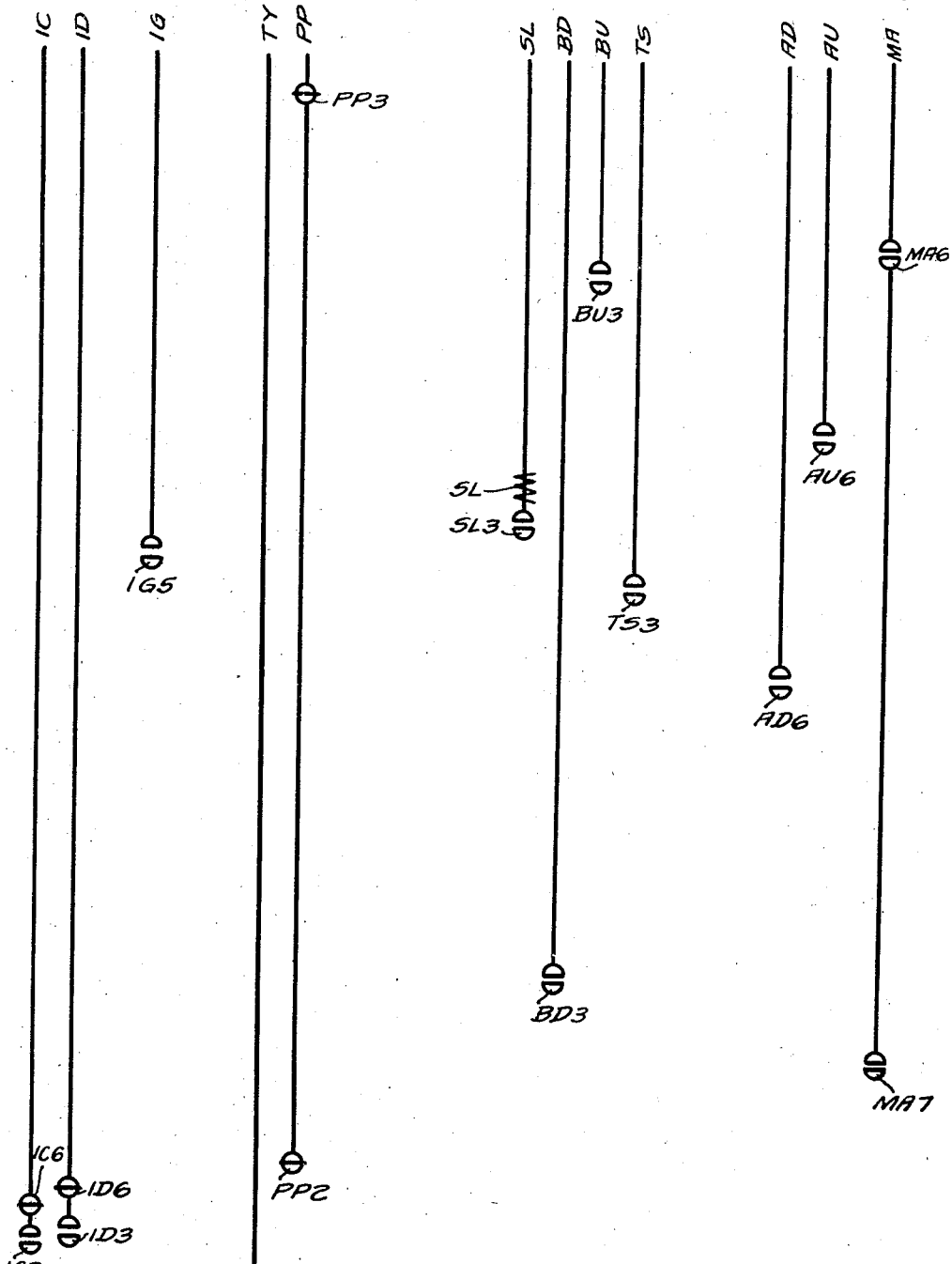

In Figs. 14 and 15 is shown the landing call timing circuit. The single motion selector switches having the magnets D2 to D9 and U2 to U9 are of the type used in automatic telephone exchanges and commonly known as uni-selectors. The selector switches are common to all three cars. Each has a plurality of groups or banks of contacts. The contacts in each group are arranged in order to be wiped consecutively by wiper arms. The wiper arms for the "up" selector switch for the third floor are mounted on one shaft SH driven by the impulse driving magnet U3 so that they will be operated simultaneously by the same mechanism and are designated as U3W1 and U3W2 in Fig. 15 and as U3W3 in Fig. 14. The wiper U3W3 and its contacts operate in the circuit for car X. Those for cars Y and Z operate in the same manner but are not shown. However, calls from the upper and lower terminal floors are not timed and therefore selector switches are not provided for these floors. The reason for not timing the calls from the terminal floors is that the car has to stop at these floors to reverse.

When an "up" landing call is registered for example at floor 3, contacts 3U7 of the landing call storage relay 3U connects the driving magnet U3 of the corresponding selector switch to the impulsing contact TK1 via selector bank U3W1. Each impulse of the magnet steps the arms to the next contact. When a sufficient number of impulses has been received to step the selector switch to the last bank contact, the impulsing circuit is opened and the selector switch does not step any further.

When the landing call is answered, the landing call relay releases and its back contacts 3U8 complete a self-interrupting circuit in series with the interrupter springs $u3$ for magnet U3 whereupon the selector switch wipers are restored to the first set of bank contacts.

The starting of the car is effected by registering a stop call on either a car button 3C, etc. or on a hall stop button 3U, etc. For example, the closing of car button contacts 3C2 for the third floor (Fig. 6), when the car is at floor 1, energizes up direction relay AU to close its contacts AU4 (Fig. 8) to energize the up contactor UP of the car and that causes the car to start on an up trip. If a stop call were registered on up hall call button 3U, its contacts 3U2 would close thus energizing the initial up direction relay BU to close its contacts BU1 thereby energizing the up direction relay AU to close its contacts AU4 to energize the up contactor UP to start the car upwardly in the same manner as it does in starting in connection with a car call.

The stopping of the car when it answers a call is effected by the slow down relay SL and the stopping inductor relay SR. The relay SL initiates the slowing down of the car so that it can stop at the floor immediately ahead. The slowing down of a car for a stop is effected when that car approaches the floor for which a stop call is registered on either its car button or the floor button. For example, with a landing call registered for an up stop at the third floor for the car which includes that floor in its zone, as the car approaches the third floor, its movement opens the contacts S1 and S2 (Fig. 3) on its floor selector (not shown) thereby releasing the floor selector relay 2F, which, in turn, energizes floor position relay 2G to close its contacts 2G5 (see Fig. 14) thereby energizing the slowdown relay SL by the circuit:

+, 2G5, U3W3, SQ3, MQ3, 3U3,
        PP3, MA6, BU3, AU6, SL, TS3, —

If the car is making an up stop at the third floor for a car button call, the slowdown relay circuit will extend:

+, 2G5, 3C4, AU6, SL, TS3, —

The energized slowdown relay operates its contacts (not shown) to slow down the car for a stop at the next floor and opens its contacts SL4 (Fig. 8) to remove the short circuit around the stopping inductor relay SR and thereby cause energization of that relay to stop the car as it arrives level with the floor. Inasmuch as inductor relays comprising a coil mounted on the car and a magnetizing plate mounted on the hatchway wall are old and well known, no detailed description thereof is given. The stopping inductor contacts SS of relay SR open as the car reaches floor level whereupon the circuit of the appropriate driving contactor UP or DN is opened and the car comes to rest.

The upper half of Fig. 14 shows the "up" slowdown circuit, and the lower half shows the "down" slowdown circuit.

In the case of car calls, the circuit of relay SL is completed via operated contacts of the appropriate relay G, operated contacts 3U3 of the car call relay, operated contacts of relay AU or AD, the coil of relay SL and operated TS3. Relay SL holds via SL3.

When the car is answering a landing call, the circuit of relay SL is completed via operated contacts of the appropriate G relay, selector switch bank such as bank W3, normal contacts of relays SQ and MQ, operated contacts (3U3, etc.) of the landing call relay, normal PP2 or PP3, operated MA6 or MA7, operated BU3 or BD3, operated AU6 or BD6, coil of relay SL and operated TS3.

When the selector switch wiper such as the wiper U3W3 is on one of the first five bank contacts, the call is a "short term" call. When the wiper rests on any of the bank contacts 6 to 10, the call is a "medium term" call. When the wiper rests on either of the contacts 11 or 12 the call is a "long term" call.

When a car is in the "desired" position (i. e. relays SQ and MQ are unoperated), a circuit for relay SL will be completed irrespective of the position of the selector switch wipers. When the car is in the "first delayed" position (i. e. relay SQ operated), and the call is a "short term" call, a circuit will not be completed for relay SL and consequently the car will pass the call which becomes transferred to the following car. If, however, the call is a "medium term" call (i. e. the selector switch wiper rests on a contact beyond the fifth contact), the circuit of relay SL will be completed and the car will answer the call. When the car is in the "second delayed" position (i. e. relays SQ and MQ are operated) and the selector switch wiper is on one of the first ten contacts, relay SL cannot operate and the car passes the call. When the call becomes a "long term" call (i. e. the selector switch wiper rests on either of the contacts 11 or 12), relay SL will operate even if the car is in the "first delayed" or "second delayed" position.

When a car has in its zone a call for the opposite direction to that in which it is travelling, it will not answer the call unless it is the first call ahead of the car according to the circular track principle. If other car or landing calls are registered ahead of the car in the direction in which it is travelling, the car will answer these calls and will then reverse to answer the call or calls in the opposite direction of travel. This is achieved by a chain of contacts in the circuit of relay SL. If a car is travelling upwards to answer a "down" call at floor 3, a circuit is completed for relay SL via operated 2G5 and 3D4, chain of normal 3U5, 3C5, 4D5, 4C5, etc. operated MA6, BU3, AU6, etc. If a call is registered at a floor above floor 3, the chain of normal contacts will be opened and relay SL cannot operate.

By-pass relay PP shown in Fig. 16 is controlled by a non-locking by-pass button PPS fitted in the car. The by-pass button is principally intended for use when the starting of the car is under the control of an attendent. When a car is fully loaded the by-pass is operated and relay PP operates and holds via operated PP1. PP2 and PP3 open the landing call slow down circuit (Fig. 14), thereby preventing the operation of relay SL except for car calls or a call in the opposite direction of travel. The car is thereby prevented from stopping unnecessarily when it is fully loaded.

When relay SL operates to allow the car to slow down to deliver passengers, SL2 releases relay PP and it returns to its unoperated position.

The out of service relay MA is released by opening the service switch SS when the car is required to be withdrawn from service. MA6 and MA7 open the landing call slow down circuits and the car will consequently stop only for car calls.

When the starting of the car is under the control of an attendant, a lamp (not shown) is illuminated by means of operated contacts (not shown) on relays AU and AD to indicate that calls exist in its operating zone. A non-locking starting switch may be connected between negative and contacts G1 (Fig. 3), these contacts being operated by the car gate CG and landing door contacts LD1, etc. When the up or down contactors UP or DN are operated, contacts of the contactors short-circuit the starting switch handle (not shown) contacts so that the starting handle need not be held operated, as is old and well known in the art.

*Zoning operation*

An assumed operation of the system will be described with car X in up operation at the second floor, car Y in up operation at the fourth floor, and car Z in down operation at the ninth floor.

In the up position of car X at the second floor, its up direction terminal relay US is energized by the circuit:

(Fig. 8), +, UL1, US, —

Its up auxiliary relay UD is held energized by:

(Fig. 8), UD2, AD5, UD

The energized relay US closes contacts US2, thereby energizing the selector relays F for the floors above the car. The circuit for relay 3F is:

(Fig. 3), +, 3F, S3, S4, S5, S6, S7, S8, S9, US2, —

The selector relays 4F to 10F are energized by approximately the same circuit. The selector relay 2F is deenergized because the position of the car opens the selector contacts S2.

The deenergized selector relay 2F of car X closes its back contacts 2F7 thus energizing the zone relay 2H by the circuit:

(Fig. 3), MA4, TF3, 2H, 2H3Y, 2H3Z, 2F7, UD4

The energized relay 2H closes its contacts 2H2 thus energizing the up zone relay 3H by the circuit:

(Fig. 3), MA4, TF3, 3H, 3H3Y, 3H3Z, 2H2, UD4

The energized relay 3H closes its contacts 3H2, but that does not energize the relay 4H, because car Y is at the fourth floor. The position of car Y at the fourth floor has deenergized its selector relay 4FY which has opened its contacts 4F11Y in the circuit of relay 4H of car X. The deenergized relay 4FY also energizes the relay 4HY of car Y which opens its contacts 4H3Y in the circuit of relay 4H of car X. Inasmuch as the contacts 4F11Y and 4H3Y are open in the circuit of relay 3H, that relay cannot now be energized by relay 3H closing its contacts 3H2. Hence the zone of car X ends at the fourth floor where car Y is located.

When the car X energized its zone relay 2H and deenergized its selector relay 2F for the second floor, those relays also opened their contacts in the circuits of the zone relays for the second floor for the other cars to keep them from being included in the zone of car X. Consequently, the zone of car X now includes the second and third floors in up operation. This two-floor zone makes car X a "desired position" car which will accept all calls in its zone.

The up position of car Y at the fourth floor deenergizes its selector relay 4FY which, in turn, causes energization of its up zone relays 4HY, 5HY, 6HY, 7HY, 9HY and 10HY and its down relay 10KY up to car Z on its down trip at the ninth floor in the same manner that the zone for car X was set up. It will be noted that the down relay 10KY will be energized by the closing of contacts 10H2Y of energized relay 10HY for car Y.

Car Y now has a zone including the up fourth, fifth, sixth, seventh, eighth, ninth and the top terminal or tenth floor. This seven-floor zone makes car Y a "first delayed" position car which will refuse "short term" calls, but will answer "medium term" and "long term" calls as long as it has less than its quota of calls.

The down position of car Z at the ninth floor deenergizes its selector relay 9FZ for the down direction and it, in turn, causes energization of down zone relays 9KZ to 1KZ and up zone relay 1HZ for car Z in the same manner that car X established its zone.

Car Z now has a down zone including the down ninth, eighth, seventh, sixth, fifth, fourth, third, second and first floors. This nine-floor zone makes car Z a "second delayed" position car which, with a less than full quota, will refuse "short term" and "medium term" calls, but will accept "long term" calls.

Now assume that car X moves up from the second floor to the third floor. This movement removes the second floor from the zone of car X and places it in the zone of car Z.

The second floor is removed from the zone of car X because when car X moves up to the third floor it opens its selector contacts S3, thereby deenergizing its relay 3F. Since relay 2F is also released, the back contacts 3F6 and 2F5 are closed and energize the lower winding of relay 2H by the circuit:

(Fig. 3), 3F6, 2F5, 2H, 2H3Y, 2H3Z, 2F7

When relay 2H releases, its back contacts 2H2 open one circuit for relay 3H, but the closed back contacts 3F7 of relay 3F provide a holding circuit for relay 3H.

The second floor up is now placed in the zone of car Z, the next following car, because the release of relay 2H allows its back contacts 2H3X to close in a circuit for the zone relay 2HZ for car Z, thus energizing that zone relay by a circuit which will extend in a circuit for car Z similar to car X as follows:

(Fig. 3), 2HZ, 2H3Y, 2H3X, 1H2Z

Hence, as the cars move up or down the hatchway, they drop from their zone the floor they leave and cause it to be included in the zone of the next following car.

*"Desired" position car answers short term call*

Assuming that an up passenger at the third floor presses the up stop button 3 at the third floor, the up hall call relay 3U is energized by the circuit:

(Fig. 2), +, 3U, 3, —

The energized relay 3U closes its self-holding contacts 3U1 and the call is stored until it is answered by the first car conditioned to answer it when approaching in the up direction. The relay 3U also closes its contacts 3U3 to prepare the slowdown circuit (Fig. 14) for operation and its contacts 3U7 (Fig. 15) for starting the timing rotation of shaft SH. The timing device of Fig. 12 is in operation and starts moving the arms U3W1 and U3W2 in Fig. 14 and U3W3 in Fig. 15, but no action follows this because car X is on its up trip at the second floor and in its "desired" position; hence it will answer the up call at the third floor before it exists beyond its "short term" of ten seconds.

The up position of car X at the second floor deenergized its relay 2F as before described which closed its back contacts 2F9 (Fig. 5), thus energizing its floor position relay 2G by the circuit:

(Fig. 5), 2F9, 1F9, 3F10, 2G

The energized relay 2G closes its contacts 2G5

(Fig. 14) and thus energizes the slowdown relay of car X by the circuit:

(Fig. 14), 2G5, U3W3, SQ3, MQ3,
  3U3, PP3, MA6, BU2, AU6, SL, TS3

The energized relay SL operates its contacts (not shown) to slow down the car as it moves to the third floor and opens its contacts SL4 (Fig. 8) to remove the short-circuit around the stopping inductor relay SR and thereby cause energization of that relay to stop the car as it arrives level with the third floor.

Assume now that car X moves up from the second floor and is slowed down and stopped at the third floor, as it stops at the third floor, it deenergizes its selector relay 3F by opening its selector contacts S3. The deenergized relay 3F closes its back contacts 3F6 which energizes relay 3G which, in turn, closes its contacts 3G2, thus energizing the neutralizing coil of the call storing relay 3U (Fig. 2) and thereby canceling the up call at the third floor.

*Operation of quota relays*

For the purposes of this operation, it will be assumed that two to four calls constitute a half quota; that four to six calls constitute a quota; and that six calls or more constitute an excess quota for a car.

It will be assumed now that the cars X, Y and Z have been in operation for some time and are in the following positions—car X is on an up trip at the second floor; car Y is on an up trip at the eighth floor; and car Z is on a down trip at the sixth floor. In these positions, each of these cars has a zone of six floors and is consequently a "desired" position car. The energized zone relays 3H, 4H, 5H, 6H and 7H of car X have closed their contacts 3H6, 4H6, 5H6, 6H6 and 7H6 (Fig. 10), and thereby prepared the quota circuit of car X for operation.

It will be assumed further that up stop calls ahead of car X and in the zone of that car have been registered at the third and fourth floors. These two calls constitute a half quota for car X and will energize the half quota relay HQ (Fig. 10). This occurs as follows.

Pressing the up stop button 3 at the third floor landing energizes the up storage relay as before described. Pressing the up button 4 at the fourth floor landing energizes the storing relay 4U by the circuit:

(Fig. 2), +, 4U, 4, —

The energized relay 4U closes its self-holding contacts 4U1. It also closes its contacts 4U7 (Fig. 15) to connect its selecting switch driver magnet U4 to start its shaft SH, and it closes its contacts 4U3 in the fourth floor slowdown circuit for relay SL (Fig. 15). The relay 4U also closes its contacts 4U8 (Fig. 10) in the circuit of the quota relays. Inasmuch as relay 3U closed its contacts 3U8 when it was energized, the following two parallel circuits are now set up for the quota relays:

(Fig. 10), RAL, 3H6, 3U8,
  and in parallel HQ, FQ, EQ (Fig. 10), RAM, 4H6, 4U8,
  and in parallel HQ, FQ, EQ The resistors in the quota relay circuits have been so selected that they will permit the passage of sufficient current to energize the relay HQ, but not sufficient to energize the relays FQ or EQ.

The energized relay HQ closes its contacts HQ1 (Fig. 11) in the circuit of the short term relay SQ and the medium term relay MQ to prepare them for operation.

Assume now that the up button 5 at the fifth floor and the up button 6 at the sixth floor are pressed by waiting passengers, thus energizing the storing relays 5U and 6U in the same manner that relays 3U and 4U were energized. The energized relays 5U and 6U close their contacts 5U3 and 6U3 (Fig. 10), thereby including the parallel resistors RAN and RAO in parallel with the parallel resistors RAL and RAM in the circuit to the quota relays. These four resistors now permit the passage of sufficient current to energize the quota relay FQ.

The energized relay FQ closes its contacts FQ1 (Fig. 11), and thus energizes the short term relay SQ by the circuit:

(Fig. 11), TY2, FQ1, SQ, HQ1, TX2

The energized relay SQ opens its contacts SQ3 (Fig. 14) in the slowdown circuit for the third floor for car X and thereby prevents car X from accepting the up call at the third floor which is still a short term call because it has not existed yet for ten seconds. Thus car X now has three calls ahead of it instead of four. The energized relay SQ also opened its contacts in the slowdown circuits for car X at the fourth, fifth and sixth floors to prevent the car from answering those calls. However, such contacts will be reclosed now as car X moves up to the third floor.

The movement of car X to the third floor deenergizes its selector relay 3F for the third floor and it, in turn, deenergizes the zone relay 3H for car X at the third floor. The deenergized relay 3H opens its contacts 3H6 (Fig. 10) thereby opening the circuit through the resistor RAL to the quota relays. The circuit is now through only the three resistors RAM, RAN and RAO, and they do not permit the passage of sufficient current to maintain quota relay FQ in its energized condition. Hence relay FQ opens its contacts FQ1 thus deenergizing relay SQ (Fig. 11) which, in turn, closes its contacts in the slowdown circuits of car X for the fourth, fifth and sixth floors. Car X answers the call at the fourth floor as it does not now have a full quota.

*"First delayed" position car having its half quota of calls refuses to answer short term call but will accept medium term and long term calls*

Assume now that the cars have operated until car X is again on an up trip at the second floor, that car Y is on an up trip at the ninth floor, and that car Z is on a down trip at the third floor. The zone relays are operated as heretofore described with the result that car X will have a zone of seven floors, making it a "first delayed" position car; car Y will have a zone of eight floors, making it a "second delayed" car; and car Z will have a zone of three floors making it a "desired" position car.

Assume again that a waiting passenger at the third floor presses the up button 3 and thereby stores a hall call on up storing relay 3U in the manner previously described.

The energized relay 3U closes contacts 3U8 (Fig. 10). When relay 3H was energized by the relay 2F, it closed its contacts 3H6 (Fig. 10). Hence the closing of contacts 3U8 completes a circuit through the resistor RAL for the relay HQ, but this will not permit sufficient current to pass to energize relay HQ.

Assume further that up calls have been stored on the up relays 4U and 5U. These relays have closed their contacts 4U8 and 5U8 (Fig. 10), thereby providing two additional parallel circuits including resistors RAM and RAN to relay HQ. The three parallel circuits permit the passage of sufficient current to energize relay HQ, and car X now has a half quota. The energized relay HQ closes its contacts HQ1 (Fig. 11) to prepare the short term relay SQ for operation.

In this case, car X will not answer the up call at the third floor as it moves upwardly because it is a "first delayed" car with a half quota of calls by reason of the energization of its zone relays 3H, 4H, 5H, 6H, 7H and 8H. This action is effected because these zone relays close their contacts 3H5, 4H5, 5H5, 6H5, 7H5 and 8H5 in Fig. 9, thus completing parallel circuits through the resistors RN, RO, RP, RQ, RR, RS to the "first delayed" relay ST of car X. These resistors permit sufficient current to flow through the relay ST to energize it, whereupon it closes its contacts ST1 in Fig. 11, thus energizing the short term relay SQ by the circuit:

(Fig. 11), TY2, ST1, SQ, HQ1, TX2

The energized relay SQ opens its contacts SQ3 in the slowdown circuit (Fig. 14) for car X so that that circuit will be ineffective to stop car X at the third floor.

Assume now that over ten seconds have passed since the up call was stored on relay 4U at the fourth floor. During this time the timing magnet U4 of car X stepped the arm 4UW3 around until it was on its medium term segments (corresponding to 6 for arm U3W3). Therefore, a slowdown circuit for the slowdown relay SL of car X at the fourth floor will be completed as follows:

(Fig. 14), 3G5, U4W3, 6, MQ contact, etc.
(comparable to the slowdown circuit at the third floor but not shown on the drawings)

The energized slowdown relay SL stops the car X at the fourth floor. This is effected because the selector arm U4W3 has completed a circuit around contacts of short term relay SQ.

Assume now that over twenty-five seconds have passed since the up landing call relay 5U at the fifth floor was operated. The timing device of Fig. 12 has given sufficient impulses to the timing magnet U5 of car X for the fifth floor to move its selector arm U5W3 around to where it rests on the long term segment 11 of the fifth floor selector, and thereby completes a circuit for the slowdown relay SL of car X at the fifth floor through:

(Fig. 14), 4G5, U4W3, 11, etc. (not shown, but comparable with the slowdown circuit for the third floor)

This will stop car X at the fifth floor. This is effected because the selector arm U5W3 has completed a circuit around the contacts of SQ and MQ.

Assume now that the "desired" position car Z moves down to the first floor and up to the third floor. This car will accept the third floor call and stop for it because as it arrives at the second floor it deenergizes its selector relay 2FZ. The relay 2FZ will energize its position relay 2GZ in the same manner as described in connection with the stopping of car X at the third floor. The energized relay 2GZ will close its contacts 2G5Z in the stopping circuit for car Z, and thereby energize its slowdown relay SLZ to effect the stopping of car Z to answer the up call at the third floor. As car Z stops at the third floor, it deenergizes its position relay 3GZ which, in turn, closes its contacts 3G2Z and thereby cancels the up call on relay 3U at the third floor.

*"Second delayed" car with half quota does not answer medium term call*

Assume now that the cars have operated until car X is again on an up trip at the second floor, that car Y is on a down trip at the ninth floor, and that car Z is on a down trip at the eighth floor. The zone relays are operated as heretofore described with the result that car X has a zone of nine floors, making it a "second delayed" position car.

Assume that an up call was registered at the third floor by an operation of the up hall button 3, thus energizing the relay 3U and storing the up call as formerly described.

Assume further that up calls are registered at the fourth and fifth floors. The up calls registered at the third, fourth and fifth floors energize the half quota relay HQ as previously described, thus preparing the circuit in Fig. 11 for the short term relay SQ and the medium term relay MQ, and making car X a half quota car as well as a "second delayed" position car.

Assume further that so much time, say ten seconds, has passed since the call was registered that the timer of Fig. 12 has rotated the shaft SH of the up selecting switch arm 3UW3 for car X to the medium term set of contacts 6 to 10 (Fig. 14) and the call is now a "medium term" call. This is effected because the energized relay 3U closed its contacts 3U7, thus connecting the impulse driving magnet U3 to the timing impulse circuit operated by the timer of Fig. 12.

Inasmuch as car X is standing up at the second floor and car Y is standing down at the ninth floor, car X has energized its zone relays 3H, 4H, 5H, 6H, 7H, 8H, 9H, 10H, and 10K, and these relays close their contacts 3H5 to 10K5 in Fig. 9, thereby completing parallel circuits through the resistors RN, RO, RP, RQ, RR, RS, RT, RU, and RK to the "second delayed" relay MT. These resistors permit the passage of sufficient current to energize the relay MT. The energized relay MT closes its contacts MT1 and thereby energizes the "medium term" call relay MQ by the circuit:

(Fig. 11), MT1, TY3, MQ, HQ1, TX2

The energized relay MQ now opens its contacts MQ3 (Fig. 14) in the slowdown circuit of car X at the third floor from the contacts 6—10 to the slowdown relay SL, and thereby prevent energization of the slowdown relay, thus preventing the "second delayed" car X from answering the "medium term" call at the third floor.

Assuming that the cars move along until car X has passed the third floor and car Y approaches the third floor up call, then car Y, being a "desired" position car, will answer the up call thereat, because its selector will deenergize its selector relay 2FY which will energize its position relay 2GY which will, in turn, close its contacts 2G5Y in its slowdown circuit and thus complete a circuit for its slowdown relay SLY to stop it at the third floor. This occurs because the relay MQY for car Y has not been energized.

It will also be apparent that if the up call at the third floor had existed for more than, say, twenty-five seconds, it would have been a "long term" call which would have been answered by car X even if it was a "second delayed" car. This would have taken place because the timing impulses would have operated the arm 3UW3 (in twenty-five seconds) around to the point where it rested upon the contact 11 (Fig. 14), and thereby shunted around the contacts SQ3 and MQ3 so as to complete the slowdown circuit for car X.

Assumed operations involving additional actions of the cars and the system may be made, but it is believed that the operations so far given will enable any one familiar with the elevator art to thoroughly understand the system.

Although I have illustrated and described only one specific embodiment of my invention, it is to be understood that changes therein and modifications thereof may be made without departing from the spirit and scope of the invention.

I claim as my invention:

1. In an elevator system for operating a plurality of cars serving a plurality of floors, means for storing calls for service at the floors, means for registering the number of floors between each car and the car ahead of it to provide a call-answering zone for each car, means for registering the periods of time for which operated call storing means remain unanswered, means for registering the number of floors in the zone of each car having unanswered operated call storing means, and means responsive to operation of the preceding means for controlling the answering of the operated call storing means by the cars in accordance with their position with reference to each other to thereby regulate the positions of the cars.

2. In an elevator system for operating a plurality of cars serving a plurality of floors, a plurality of call devices for registering or storing calls for service at the floors, a plurality of zone devices responsive to the position and movement of the cars for preparing a call-answering zone for each car to include the floors between that car and the next car ahead, a plurality of "delayed" devices for each car, means responsive to operation of the zone devices for operating the "delayed" devices, a plurality of quota devices for each car, means responsive to operation of the zone devices and the call devices for operating the quota devices in accordance with the number of floors in each zone having operated call devices, a plurality of term devices, means responsive to operation of the "delayed" devices and the quota devices for operating the term devices, a timing means associated with each call device to count the length of time it remains in operated condition, and means responsive to operation of the term devices for each car and the timing means for determining which operated call devices in its zone it will answer.

3. In an elevator system for operating a plurality of cars serving a plurality of floors, a plurality of call devices for registering or storing calls for service at the floors, a plurality of zone devices responsive to the position and movement of the cars for preparing a call-answering zone for each car to include the floors between that car and the next car ahead, a "delayed" device for each car, means responsive to operation of the zone devices for operating the "delayed" devices, quota device for each car, means responsive to operation of the zone devices and the floor call devices for operating the quota device in accordance with the number of floors in each zone having operated call devices, a term device for each car, means responsive to operation of the "delayed" devices and the quota devices for operating the term devices, a time means associated with each call device to count the length of time it remains in operated condition, and means responsive to operation of the term device for each car and the timing means for determining which operated call devices in its zone it will answer.

4. In an elevator system for operating a plurality of cars serving a plurality of floors, a plurality of call devices for storing calls for "up" service and for "down" service at the floors, a timing device for each call device for counting the length of time after it is operated until it is restored to its unoperated condition, a plurality of zone devices responsive to the position and operation of the cars for defining a call-for-service zone for each car, said zone including the call devices between that car in the direction of its travel and the next car ahead of it, apparatus for each car for stopping it at floors for which call devices in its zone have been operated, and means responsive to operation of the zoning devices and to operation of the timing devices and the call devices for rendering the stopping device of each car effective or ineffective to stop it for an operated call device in its zone in accordance with the position of that car relative to the other cars and the length of time the operated call device has been in operated condition.

5. In an elevator system for operating a plurality of cars serving a plurality of floors including a parking floor, means for storing calls for service at the floors, means for registering the number of floors between each car and the car ahead of it to provide a call-answering zone for each car, means for registering the periods of time for which operated call storing means remain unanswered, means for registering the number of floors in the zone of each car having unanswered operated call storing means, means responsive to operation of the preceding means for controlling the answering of the operated call storing means by the cars in accordance with their position with reference to each other to thereby regulate the positions of the cars, and means responsive to the inclusion of the parking floor in the zone of a car which has no operated call storing means in its zone for parking that car at the parking floor.

6. In an elevator system for operating a plurality of cars serving a plurality of floors, means for storing calls for service at the floors, means for registering the number of floors between each car and the car ahead of it to provide a call-answering zone for each car, means for registering the periods of time for which operated call storing means remain unanswered, means for registering the number of floors having unanswered operated call storing means in the zone of each car, means responsive to operation of the preceding means for controlling the answering of the operated call storing means by the cars in accordance with their position with reference to each other to thereby regulate the positions of the cars, and means responsive to a car passing an operated call storing means in its zone for transferring said operated call storing means to the zone of the next following car.

7. In an elevator system for operating a plurality of cars serving a plurality of floors including a parking floor, means for storing calls for service at the floors, means for registering the number of floors between each car and the car ahead of it to provide a call-answering zone for each car, means for registering the periods of time for which operated call storing means remain unanswered, means for registering the number of floors in the zone of each car having unanswered operated call storing means, means responsive to operation of the preceding means for controlling the answering of the operated call storing means by the cars in accordance with their position with reference to each other to thereby regulate the position of the cars, a plurality of signal devices at the parking floor, one for each car, and means responsive to the parking of a car at the parking floor for operating its signal device to indicate that it is ready to leave the parking floor.

8. In an elevator system for operating a plurality of cars serving a plurality of floors, means for storing calls for service at the floors, means for registering the number of floors between each car and the car ahead of it to provide a call-answering zone for each car, means for registering the periods of time for which operated call storing means remain unanswered, means for registering the number of floors in the zone of each car having unanswered operated call storing means, means responsive to operation of the preceding means for controlling the answering of the operated call storing means by the cars in accordance with their position with reference to each other to thereby regulate the positions of the cars, and a manually operative means associated with each car for causing it to by-pass operated call storing means when desired.

9. In an elevator system for operating a plurality of cars serving a plurality of floors, means for storing calls for service at the floors, means for registering the number of floors between each car and the car ahead of it to provide a call-answering zone for each car, means for registering the periods of time for which operated call storing means remain unanswered, means for registering the number of floors in the zone of each car having unanswered operated call storing means, means responsive to operation of the preceding means for controlling the answering of the operated call storing means by the cars in accordance with their position with reference to each other to thereby regulate the positions of the cars, a manual device associated with each car, means responsive to momentary operation of one of said manual devices for causing the car with which it is associated to by-pass operated call storing means, and means responsive to a car stopping at a floor for restoring its operated manual device to its normal condition.

10. In an elevator system for operating a plurality of cars serving a plurality of floors, means for storing calls for service at the floors, means for registering the number of floors between each car and the next car ahead of it to provide a call-answering zone for each car, means for registering the periods of time for which operated call storing means remain unanswered, means for registering the number of floors in the zone of each car having unanswered operated call storing means, means responsive to operation of the preceding means for controlling the answering of the operated call storing means by the cars in accordance with their position with reference to each other to thereby regulate the positions of the cars, means associated with a car to permit it to be operated by an attendant, a signal device for that car, and means responsive to the operation of a call storing means in the zone of that car for operating said signal device to indicate to the attendant that that car has operated call storing means in its zone.

11. In an elevator system for operating a plurality of cars serving a plurality of floors, means for storing calls for service at the floors, means for registering the number of floors between each car and the car ahead of it to provide a call-answering zone for each car, means for registering the periods of time for which operated call storing means remain unanswered, means for registering the number of floors in the zone of each car having unanswered operated call storing means, means responsive to operation of the preceding means for controlling the answering of the operated call storing means by the cars in accordance with their position with reference to each other to thereby regulate the positions of the cars, means for withdrawing a car from service in the system, and means responsive to withdrawal of a car from service in the system for transferring the unanswered operated call storing means in its zone to the next following car and for altering the classes of operated call storing means which the cars remaining in the system will answer.

12. In an elevator system for operating a plurality of cars serving a plurality of floors, means for storing calls for service at the floors, means for registering the number of floors between each car and the next car ahead of it to provide a call-answering zone for each car, means for registering the period of time for which operated call storing means remain unanswered, means for registering the number of floors in the zone of each car having unanswered operated call storing means, means responsive to operation of the preceding means for controlling the answering of the operated call storing means by the cars in accordance with their position with reference to each other to thereby regulate the positions of the cars, means responsive to a car in the system failing to start or, after starting, stopping for a predetermined period of time, for transferring the operated call storing means in the zone of that car to the zone of the next following car.

13. In an elevator control system for a plurality of cars operable past a plurality of floors, switch means at each floor for storing calls for service and for causing a car to stop at said floor, a timing means for each switch means for measuring the time a call is stored thereon until it is answered, and means responsive to the number of stored calls between an approaching car and the next car ahead of it for rendering such of said stored calls as have been stored for less than a predetermined time ineffective to stop said approaching car.

S. T. HUNT.